US012792766B2

(12) United States Patent
Nawathe et al.

(10) Patent No.: US 12,792,766 B2
(45) Date of Patent: Nov. 10, 2026

(54) AUDIENCE ANALYSIS SYSTEM USING PROBABILISTIC DATA STRUCTURES

(71) Applicant: Adobe Inc., San Jose, CA (US)

(72) Inventors: Sandeep Anant Nawathe, Sunnyvale, CA (US); Yeshwanth Vijayakumar, Sunnyvale, CA (US); Bowen Wang, Milpitas, CA (US); Antonio Cuevas, Mountain View, CA (US)

(73) Assignee: Adobe Inc., San Jose, CA (US)

( * ) Notice: Subject to any disclaimer, the term of this patent is extended or adjusted under 35 U.S.C. 154(b) by 37 days.

(21) Appl. No.: 18/946,686

(22) Filed: Nov. 13, 2024

(65) Prior Publication Data

US 2026/0134137 A1 May 14, 2026

(51) Int. Cl.
*G06F 21/62* (2013.01)
*G06F 16/22* (2019.01)

(52) U.S. Cl.
CPC ...... *G06F 21/6227* (2013.01); *G06F 16/2228* (2019.01)

(58) Field of Classification Search
CPC ............... G06Q 30/02; G06Q 30/0242; G06Q 30/0246; G06Q 30/0244; G06Q 30/0254; G06Q 30/0204; G06F 16/2255; G06F 16/24556; G06F 16/2456; G06F 16/2379; G06F 16/245; G06F 16/2246; G06F 21/6245; G06F 21/6227; G06F 21/6254; H04L 9/085; H04L 2209/46; H04L 63/0421; H04N 21/25; G06N 7/01
See application file for complete search history.

(56) References Cited

U.S. PATENT DOCUMENTS 8,438,184 B1 5/2013 Wang et al.
8,880,880 B2 11/2014 Mao et al.
(Continued)

OTHER PUBLICATIONS

Choi, et al., "Differentially-Private Multi-Party Sketching for Large-Scale Statistics", sciendo, Proceedings on Privacy Enhancing Technologies, 2020 (3):153-174, [retrieved from the internet on Feb. 28, 2025], <https://petsymposium.org/popets/2020/popets-2020-0047.pdf>, 2020, 22 pages.

(Continued)

*Primary Examiner* — Brian F Shaw
(74) *Attorney, Agent, or Firm* — FIG. 1 Patents

(57) ABSTRACT

An audience analysis system using probabilistic data structure is described. In one or more examples, a targeted dataset is received from a first entity. The targeted dataset has a plurality of target dataset records describing a target audience subject to a targeted content control strategy. A targeted set of sketches is generated as probabilistic data structures based on the targeted dataset. A realized dataset is received from a second entity. The realized dataset has a plurality of realized dataset records describing digital content exposure of a realized audience to the targeted content control strategy. A realized set of sketches is generated as probabilistic data structures based on the realized dataset. The targeted set of sketches and the realized set of sketches are then stored in one or more databases in support of one or more operations, execution of which generates a probabilistic result to a query.

20 Claims, 27 Drawing Sheets

(56) References Cited

U.S. PATENT DOCUMENTS

| | | | |
|---|---|---|---|
| 9,298,934 | B1 | 3/2016 | Sang et al. |
| 9,349,132 | B2 | 5/2016 | Cronin et al. |
| 9,471,791 | B2 | 10/2016 | Fawaz et al. |
| 10,579,808 | B2 | 3/2020 | Baldwin et al. |
| 10,579,831 | B2 | 3/2020 | Rubin et al. |
| 10,642,994 | B1 | 5/2020 | Allen et al. |
| 10,831,920 | B2 | 11/2020 | Luo et al. |
| 10,878,335 | B1 | 12/2020 | Waugh |
| 10,943,680 | B1 | 3/2021 | Knas et al. |
| 10,963,541 | B2 | 3/2021 | Cronin et al. |
| 10,970,393 | B1 | 4/2021 | Stiles |
| 11,720,708 | B2 | 8/2023 | Torbey |
| 11,741,068 | B2 | 8/2023 | Sheppard et al. |
| 11,755,545 | B2 | 9/2023 | Sheppard et al. |
| 11,854,030 | B2 | 12/2023 | Sheppard et al. |
| 11,983,228 | B1 | 5/2024 | Swope |
| 12,314,240 | B1 | 5/2025 | Opincariu et al. |
| 12,353,586 | B2 | 7/2025 | Langseth et al. |
| 12,401,835 | B2 | 8/2025 | Govindarajan |
| 2014/0278771 | A1 | 9/2014 | Rehman et al. |
| 2014/0280153 | A1 | 9/2014 | Cronin et al. |
| 2014/0280193 | A1 | 9/2014 | Cronin et al. |
| 2015/0178769 | A1* | 6/2015 | Mirisola ............. H04L 63/0428 705/14.45 |
| 2016/0028774 | A1 | 1/2016 | Vahlis et al. |
| 2017/0359363 | A1 | 12/2017 | Thakurta et al. |
| 2018/0039619 | A1 | 2/2018 | Thakurta et al. |
| 2018/0182052 | A1 | 6/2018 | Panagos |
| 2018/0349636 | A1 | 12/2018 | Bhowmick et al. |
| 2020/0401726 | A1 | 12/2020 | Lim et al. |
| 2021/0165786 | A1 | 6/2021 | Halstead et al. |
| 2021/0248629 | A1 | 8/2021 | Sullivan et al. |
| 2021/0357403 | A1 | 11/2021 | Dash et al. |
| 2021/0359836 | A1 | 11/2021 | Wright et al. |
| 2022/0012349 | A1 | 1/2022 | Kirkwood et al. |
| 2022/0036390 | A1 | 2/2022 | Sheppard et al. |
| 2022/0292101 | A1 | 9/2022 | Mai et al. |
| 2023/0004997 | A1 | 1/2023 | Sheppard et al. |
| 2023/0052628 | A1 | 2/2023 | Wang et al. |
| 2023/0421559 | A1 | 12/2023 | Daskon Herath Mudiyanselage et al. |
| 2024/0005022 | A1 | 1/2024 | Cook et al. |
| 2024/0045866 | A1 | 2/2024 | Bordawekar et al. |
| 2024/0078223 | A1 | 3/2024 | Sheppard et al. |
| 2024/0104228 | A1 | 3/2024 | Clegg |
| 2024/0152954 | A1* | 5/2024 | Bramble ............ G06Q 30/0242 |
| 2024/0214385 | A1 | 6/2024 | Wang et al. |
| 2024/0249019 | A1 | 7/2024 | Nouri et al. |
| 2024/0281453 | A1 | 8/2024 | Tarmazdi |
| 2024/0281564 | A1 | 8/2024 | Kairouz et al. |
| 2024/0364361 | A1 | 10/2024 | Yan et al. |
| 2025/0156300 | A1 | 5/2025 | Peng et al. |
| 2025/0209198 | A1 | 6/2025 | Madan et al. |
| 2025/0209199 | A1 | 6/2025 | Madan et al. |
| 2025/0342271 | A1 | 11/2025 | Chen et al. |
| 2026/0003996 | A1 | 1/2026 | Cesar et al. |
| 2026/0099622 | A1 | 4/2026 | Nawathe et al. |
| 2026/0099623 | A1 | 4/2026 | Nawathe et al. |
| 2026/0105177 | A1 | 4/2026 | Nawathe et al. |
| 2026/0141288 | A1 | 5/2026 | Nawathe et al. |
| 2026/0178767 | A1 | 6/2026 | Nawathe et al. |
| 2026/0178769 | A1 | 6/2026 | Nawathe et al. |

OTHER PUBLICATIONS

Dalvi, et al., "Queries and Materialized Views on Probabilistic Databases", Journal of Computer and System Sciences, 77, 2011, pp. 473-490.

Dickens, et al., "Order-Invariant Cardinality Estimators Are Differentially Private", Cornell University, arXiv.org, [retrieved from the internet on Feb. 28, 2025], <https://arxiv.org/pdf/2203.15400>, Feb. 3, 2023, 23 pages.

Github, "Differential Privacy", GitHub, [retrieved from the internet on Feb. 26, 2025], <https://github.com/google/differential-privacy>, 2025, 7 pages.

Ido, et al., "Pursuant to MPEP § 2001.06(b) the applicant brings the following co-pending application to the Examiner's attention:", U.S. Appl. No. 18/672,990, filed May 23, 2024, 68 pages.

MIT, "MIT Probabilistic Computing Project", [retrieved from the internet on Nov. 24, 2024], <http://probcomp.csail.mit.edu/software/bayesdb/>, 2024, 3 pages.

Nawathe, et al., "Pursuant to MPEP § 2001.06(b) the applicant brings the following co-pending application to the Examiner's attention:", U.S. Appl. No. 19/011,348, filed Jan. 6, 2025, 100 pages.

Nawathe, et al., "Pursuant to MPEP § 2001.06(b) the applicant brings the following co-pending application to the Examiner's attention:", U.S. Appl. No. 18/909,584, filed Oct. 8, 2024, 63 pages.

Nawathe, et al., "Pursuant to MPEP § 2001.06(b) the applicant brings the following co-pending application to the Examiner's attention:", U.S. Appl. No. 18/909,530, filed Oct. 8, 2024, 64 pages.

Nawathe, et al., "Pursuant to MPEP § 2001.06(b) the applicant brings the following co-pending application to the Examiner's attention:", U.S. Appl. No. 18/912,872, filed Oct. 11, 2024, 87 pages.

Nawathe, et al., "Pursuant to MPEP § 2001.06(b) the applicant brings the following co-pending application to the Examiner's attention:", U.S. Appl. No. 18/946,686, filed Nov. 13, 2024, 113 pages.

Nawathe, et al., "Pursuant to MPEP § 2001.06(b) the applicant brings the following co-pending application to the Examiner's attention:", U.S. Appl. No. 18/952,628, filed Nov. 19, 2024, 109 pages.

Nawathe, et al., "Pursuant to MPEP § 2001.06(b) the applicant brings the following co-pending application to the Examiner's attention:", U.S. Appl. No. 18/988,202, filed Dec. 19, 2024, 105 pages.

Nawathe, et al., "Pursuant to MPEP § 2001.06(b) the applicant brings the following co-pending application to the Examiner's attention:", U.S. Appl. No. 18/988,635, filed Dec. 19, 2024, 99 pages.

Opendp, "Use Our Tools—OpenDP Library", [retrieved from the internet on Feb. 26, 2025], <https://opendp.org/tools>, 2025, 5 pages.

Krishnamurthy et al., "Sketch-based Change Detection: Methods, Evaluation, and Applications," IMC '03: Proceedings of the 3rd ACM SIGCOMM conference on Internet measurement, Oct. 27, 2003, 14 pages.

Non-Final Office Action issued in U.S. Appl. No. 19/011,348, mailed Nov. 21, 2025, 28 pages.

Ueda et al., "Change Detection with Probabilistic Models on Persistence Diagrams," 2022 IEEE International Conference on Data Mining (ICDM), Nov. 28, 2022, pp. 1191-1196.

892 issued in U.S. Appl. No. 18/909,584, mailed Mar. 31, 2026, 2 pages.

Cormode, Graham, "Sketch Techniques for Approximate Query Processing", 2011, 67 pages.

Final Office Action issued in U.S. Appl. No. 19/011,348, mailed Feb. 26, 2026, 17 pages.

Non-Final Office Action issued in U.S. Appl. No. 18/912,872, mailed May 11, 2026, 13 pages.

Non-Final Office Action issued in U.S. Appl. No. 18/988,202, mailed Jun. 17, 2026, 18 pages.

Non-Final Office Action issued in U.S. Appl. No. 18/988,635, mailed May 11, 2026, 34 pages.

Restriction Requirement issued in U.S. Appl. No. 18/909,530, mailed May 5, 2026, 7 pages.

* cited by examiner

| HashedEmail[] | ipAddress[] | Audienceid[] |
| --- | --- | --- |
| E1, E2 | ip1, ip2 | a1, a2, a3 |
| E3 | ip3 | a1 |
| E4 | | a3 |

| Sketch | Membership IDs |
| --- | --- |
| Hashedemail-a1 | E1, E2, E3 |
| Hashedemail-a2 | E1, E2 |
| Hashedemail-a3 | E1, E2, E4 |
| ipAddress-a1 | ip1, ip2, ip3 |
| ipAddress-a2 | ip1, ip2 |
| ipAddress-a3 | ip1, ip2 |

400

Dataset Manager Module 122

| Data Type | Sketch Family Generated |
|---|---|
| Categorical | Membership querying, Cardinality Estimators, Similarity Checks |
| Categorical Number | Membership querying, Cardinality Estimators, Similarity Checks |
| Continuous Valued | Membership querying, Cardinality Estimators, Similarity Checks, Frequency Estimators, Rank Estimators |

Fig. 4

500

Dataset Manager Module 122

| Hashed Email | age | gender | preferences[] |
|---|---|---|---|
| E1 | 35 | M | shoes, belts |
| E2 | 24 | F | |
| E3 | 40 | NA | |
| E4 | 22 | F | |

Fig. 5

AUDIENCE ANALYSIS SYSTEM USING PROBABILISTIC DATA STRUCTURES

BACKGROUND

Confidential information of users is under constant attack by malicious parties that attempt to expose and exploit this potentially valuable information. Confidential information, for instance, may include personally identifiable information used to identify a user, itself, involve access to accounts associated with the user, and so forth. Data breaches have become common in which confidential information is exposed of millions and even billions of users due to hacking from these malicious parties. Because of this, users are less willing to share this information and are concerned with how this information is used even by legitimate service provider systems.

Techniques have been developed to address this unwillingness that limit user tracking, reject use of "cookies," and so forth. As a result, computational functionality that relies on this data may fail for its intended purpose. This failure results in inaccuracies caused by incomplete data, causes inefficient use of computational resources that are implemented to overcome these technical challenges, and so forth.

SUMMARY

An audience analysis system using probabilistic data structure is described. In one or more examples, a targeted dataset is received from a first entity. The targeted dataset has a plurality of target dataset records describing a target audience subject to a targeted content control strategy. A targeted set of sketches is generated as probabilistic data structures based on the targeted dataset. A realized dataset is received from a second entity. The realized dataset has a plurality of realized dataset records describing digital content exposure of a realized audience to the targeted content control strategy. A realized set of sketches is generated as probabilistic data structures based on the realized dataset. The targeted set of sketches and the realized set of sketches are then stored in one or more databases in support of one or more operations, execution of which generates a probabilistic result to a query.

A query may then be formed for processing by one or more databases having a targeted set of sketches configured as probabilistic data structures based on a targeted dataset and a realized set of sketches configured as probabilistic data structures based on a realized dataset. The one or more databases, for instance, are maintained in a shared environment. A result is received including at least one sketch having a probabilistic data structure generated based on at least one sketch from the targeted set of sketches and at least one sketch from the realized set of sketches. An audience is materialized based on a mapping of confidential information to the probabilistic data structure, e.g., within a protected environment associated with a strategy computing device corresponding to the targeted dataset or a publisher computing device corresponding to the realized dataset.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

FIG. 4 depicts a table in an example implementation showing types of sketches generated for respective data types by a dataset manager module.

FIG. 5 depicts an example implementation of sketch generation methodology employed by a dataset manager module.

DETAILED DESCRIPTION

Overview

Figure 1:
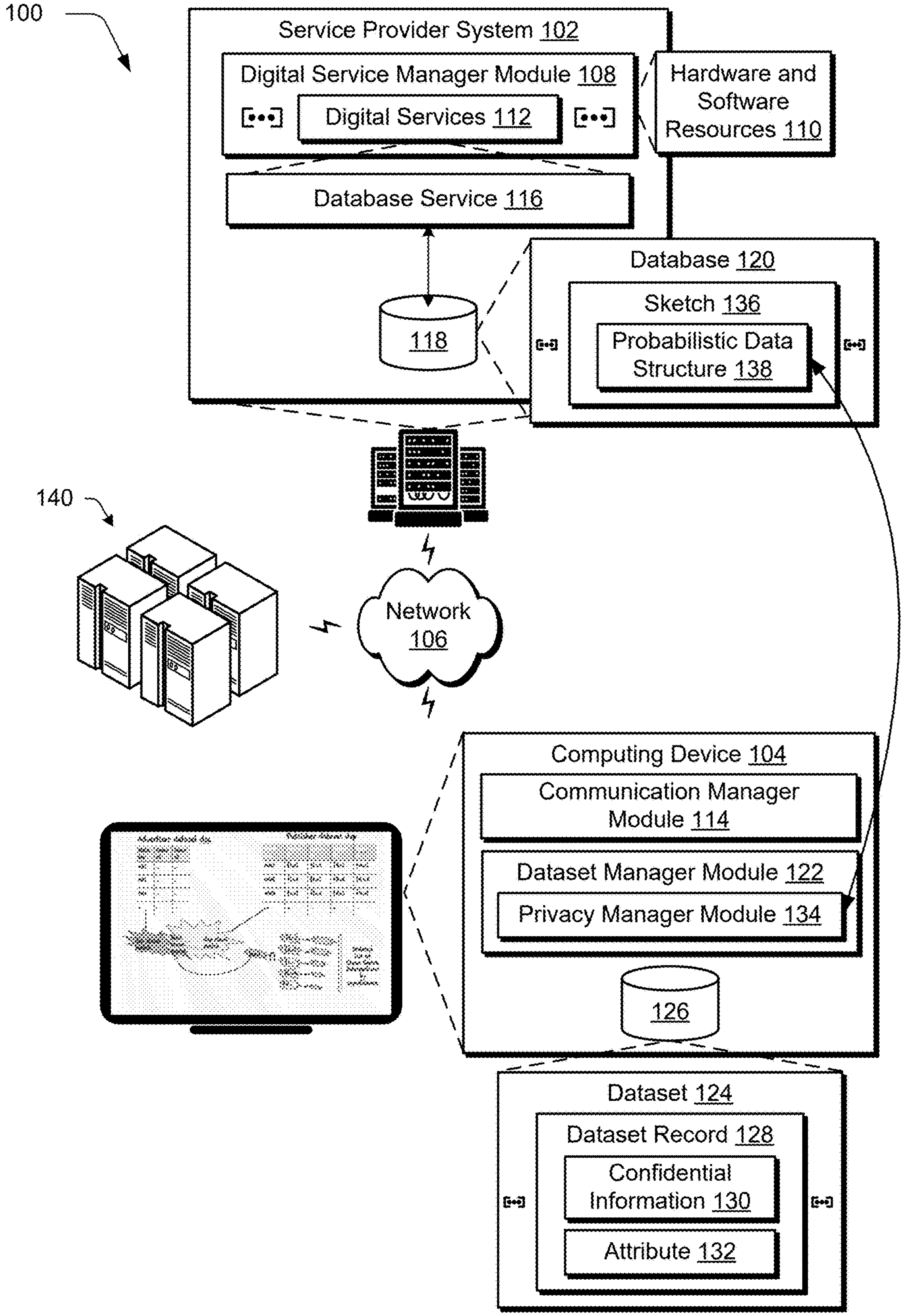
FIG. 1 is an illustration of a digital medium environment in an example implementation that is operable to employ data privacy management techniques described herein as implemented using a probabilistic data structure.

Confidential information refers to a variety of information types, including information usable to identify a user also known as "personally identifiable information," identify membership in particular audiences, potentially sensitive information (e.g., medical information), and so forth. Examples of personally identifiable information, for instance, include a full legal name, nickname, birthday, social security number, passport number, email address, phone number, home address, financial information, and even biometric data such as facial recognition data, retinal scans, fingerprints, and so forth. Additional examples include membership in a particular audience.

As previously described, data breaches caused by malicious parties have resulted in the compromise of millions and even billions of instances of confidential information. In order to protect this information, privacy regulations and other privacy related considerations have been enacted to limit what user data is available for collection. These considerations have been addressed in a variety of ways through local privacy settings of a respective computing device, cookie-related changes in which browsers block cookie storage, and so forth.

Selection of an option "do not track," for instance, restricts collection of navigation data of a user between websites, applications, and so forth. Likewise, removal of support for third-party cookies by browsers also limits an ability of a provider of the cookie to gain valuable user insight usable to track user navigation through pages of a website, navigation between websites, and so forth. Consequently, computational functionality that is configured to leverage this insight often fails and is inaccurate, e.g., recommendation engines, digital content output control functionality, search engines, and so forth.

Accordingly, data privacy management techniques are described herein that address these and other technical challenges in maintaining and sharing data that may contain confidential information. The data privacy management techniques, for instance, are configurable to leverage a probabilistic data structure as a privacy-safe, efficient, and scalable technique in support of data collaboration and query execution. As a result, these privacy-management techniques leverage use of a database having probabilistic data structures and data collaboration systems to ensure privacy regulation compliance as well as adapt to an ever-changing landscape in how user insight is gained.

To do so, probabilistic data structures and a database having probabilistic data structures are employed that do not include confidential information while maintaining data associated with the confidential information through the use of a "sketch." A sketch employs a probabilistic data structure that is used to represent data in a condensed form. Sketches, for instance, employ algorithms (e.g., a Bloom filter, a Theta Sketch, or a MinHash), that support data representation without storing row-level information containing the confidential information, which ensures privacy by eliminating use of user identities, user audiences, or other confidential information. By storing a sketch independent of row-level data, recovery of a corresponding user, entity, or other confidential information associated with the data is not possible. Thus, a database having probabilistic data structures (e.g., the sketch) does not support direct identification of the confidential information. As a result, these techniques support compliance with privacy regulations and eliminate a risk of data leakage.

Sketches are also configurable to represent data in a highly condensed form, thereby reducing an amount of data that is stored and processed. This efficiency supports faster query execution and efficient use of computational resources. Conventional queries that could take days to process by a computing device (e.g., set operations), for instance, are performable in real time using the techniques described herein.

Additionally, the condensed nature of sketches enables efficient multi-cloud, multi-region implementation as well as multiparty collaboration. Therefore, seamless data sharing and query execution is supported across different platforms and regions. In this way, use of sketches as probabilistic data structures as well as databases having probabilistic data structures support a robust and scalable solution to the technical challenges involved with confidential information.

Further discussion of these and other examples is included in the following sections and shown in corresponding figures.

Term Examples

A "probabilistic data structure" is a specialized data structure that is configurable to provide probabilistic responses to a query. A probabilistic data structure, for instance, is configurable to define a probability distribution over possible database instances, e.g., possible worlds.

A "Bloom Filter" is an example of a probabilistic data structure that is configurable to test when an element is or is not a member of a set.

A "MinHash" is an example of a probabilistic data structure that is configured to estimate similarity between two or more sets. MinHash works by hashing each element in a set using one or more hash functions. For each hash function, a minimum hash value is selected. Similarity between the set is estimated by comparing the selected minimum hash values.

A "count-min sketch" is an example of a probabilistic data structure that is configurable to estimate a frequency of elements in a dataset.

A "HyperLogLog" is an example of a probabilistic data structure usable to estimate a number of distinct elements in a data set.

A "Theta Sketch" is an example of a probabilistic data structure that is usable for approximate distinct counting and set operation. Theta sketches support set operations such as union, intersection, and set difference.

A "machine-learning model" refers to a computer representation that can be tuned (e.g., trained and retrained) based on inputs to approximate unknown functions. In particular, the term machine-learning model can include a model that utilizes algorithms to learn from, and make predictions on, known data by analyzing training data to learn and relearn to generate outputs that reflect patterns and attributes of the training data. Examples of machine-learning models include neural networks, convolutional neural networks (CNNs), long short-term memory (LSTM) neural networks, decision trees, and so forth.

In the following discussion, an example environment is described that employs the techniques described herein. Example procedures are also described that are performable in the example environment as well as other environments. Consequently, performance of the example procedures is not limited to the example environment and the example environment is not limited to performance of the example procedures.

Example Data Privacy Management Environment

FIG. 1 is an illustration of a digital medium environment 100 in an example implementation that is operable to employ data privacy management techniques described herein as implemented using a probabilistic data structure to control confidential information access. The illustrated environment 100 includes a service provider system 102 and a computing device 104 that are communicatively coupled, one to another, via a network 106. Computing devices are configurable in a variety of ways.

A computing device, for instance, is configurable as a desktop computer, a laptop computer, a mobile device (e.g., assuming a handheld configuration such as a tablet or mobile phone), and so forth. Thus, a computing device ranges from full resource devices with substantial memory and processor resources (e.g., personal computers, game consoles) to a low-resource device with limited memory and/or processing resources (e.g., mobile devices). Additionally, although a single computing device is shown and described in instances in the following discussion, a computing device is also representative of a plurality of different devices, such as multiple servers utilized by a business to perform operations "over the cloud" for the service provider system 102 and as further described in relation to FIG. 14.

The service provider system 102 includes a digital service manager module 108 that is implemented using hardware and software resources 110 (e.g., a processing device and computer-readable storage medium) in support of one or more digital services 112. Digital services 112 are made available, remotely, via the network 106 to computing devices, e.g., computing device 104.

Digital services 112 are scalable through implementation by the hardware and software resources 110 and support a variety of functionalities, including accessibility, verification, real-time processing, analytics, load balancing, data storage, and so forth. Examples of digital services include a social media service, streaming service, digital content repository service, database service, content collaboration service, and so on. Accordingly, a communication manager module 114 (e.g., network-enabled application) is utilized by the computing device 104 to access the one or more digital services 112 via the network 106. A result of processing using the digital services 112 is then returned to the computing device 104 via the network 106.

In the illustrated example, the digital services 112 are utilized to implement a database service 116. The database service 116 is illustrated in this example as accessing a storage device 118 that maintains a database 120 having probabilistic data structures 138. The computing device 104 is illustrated as including a dataset manager module 122 that is configured to manage exposure of a dataset 124 (e.g., also illustrated as stored in a storage device 126) to the database service 116.

The dataset 124, for instance, is formed using a plurality of dataset records, an example of which is depicted as dataset record 128. The dataset record 128 in this example includes confidential information 130 and an attribute 132. The dataset record 128, for instance, is associated with an item of digital content (e.g., an email, webpage, etc.) as an identity key (e.g., a column header) and the attribute 132 indicates whether a particular user interacted with the digital content, e.g., as row-level data. The confidential information 130 in this example is a membership identifier (ID) that identifies a particular entity (e.g., user) associated with the attribute 132 as row-level data for the respective identity key.

As previously described, hackers and other malicious parties continually attempt to expose the confidential information 130, e.g., the identification of the membership ID of a particular user in this example. To address these and other technical challenges such as "do not track" functionality and privacy blocking, the dataset manager module 122 employs a privacy manager module 134. The privacy manager module 134 is configured to maintain the confidential information 130 locally by the computing device 104 yet permit sharing of other parts of the dataset record 128 in support of a variety of functionalities, e.g., recommendation engines and so forth.

To do so, the privacy manager module 134 is configurable to form a sketch 136 having a probabilistic data structure 138. The probabilistic data structure 138 is configured to eliminate use of row-level data of the dataset record 128 through use of algorithms such as Bloom filters, MinHash, Theta Sketches, and so forth. This approach eliminates use of row-level information, which is the confidential information 130 in this example.

The probabilistic data structure 138 is configurable to represent the dataset record 128 in a reduced manner by condensing the dataset record 128 into a compact form by elimination of the row-level information. Elimination of row-level information thus significantly reduces an amount of data that is stored and processed, e.g., by the database service 116. For example, one hundred million rows of data on audiences may be condensed into approximately ten kilobytes of data through use of the probabilistic data structure 138 by the sketch 136.

In this way, the compact representation of the probabilistic data structure 138 by the sketch 136 enables efficient multi-cloud, multi-region, and multi-party collaboration, as the smaller data size allows for seamless data sharing and query execution across different platforms and regions. Additionally, the condensed data representation of the probabilistic data structure 138 allows for faster query execution, significantly improving processing speed when compared to conventional database techniques.

In a multi-collaboration scenario, the privacy manager module 134 of the dataset manager module 122 shares a sketch 136 having a probabilistic data structure 138 that is independent of the confidential information 130. An additional computing device 140 may perform similar operations, such that each of the computing devices 104, 140 are able to share data (e.g., attributes and identity keys associated with the confidential information 130) without exposing the confidential information 130. Further discussion of these and other examples is included in the following sections and shown in corresponding figures.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Example Data Privacy Management

The following discussion describes data privacy management techniques that are implementable utilizing the described systems and devices through use of a probabilistic data structure. Aspects of each of the procedures are implemented in hardware, firmware, software, or a combination thereof. The procedures are shown as a set of blocks that specify operations performable by hardware and are not necessarily limited to the orders shown for performing the operations by the respective blocks. Blocks of the procedures, for instance, specify operations programmable by hardware (e.g., processor, microprocessor, controller, firmware) as instructions thereby creating a special purpose machine for carrying out an algorithm as illustrated by the flow diagram. As a result, the instructions are storable on a computer-readable storage medium that causes the hardware to perform the algorithm.

Figure 6:
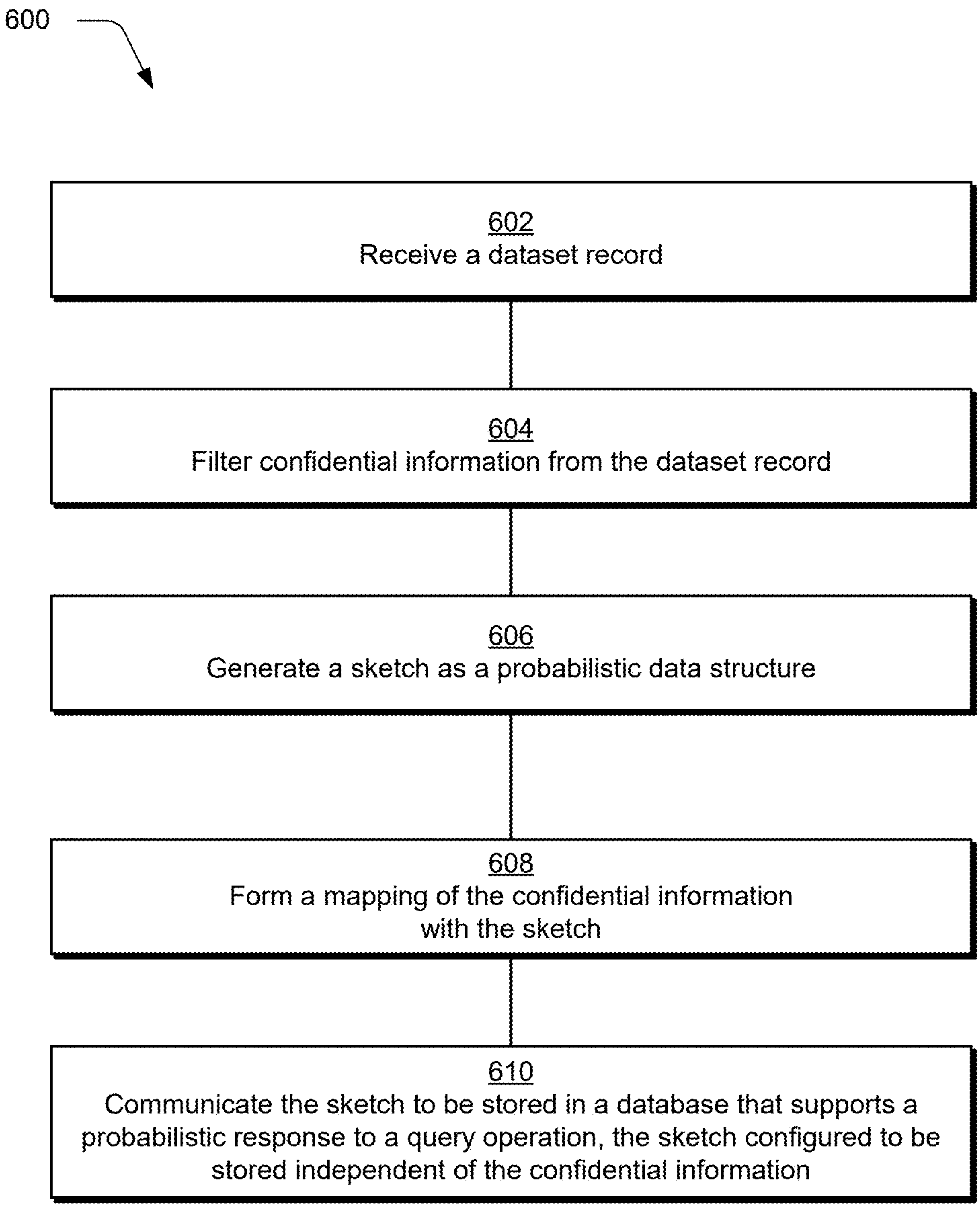
FIG. 6 is a flow diagram depicting an algorithm as a step-by-step procedure in an example implementation of operations performable for accomplishing a result of data privacy management utilizing sketch generation and mapping formation.

FIG. 6 is a flow diagram depicting an algorithm 600 as a step-by-step procedure in an example implementation of operations performable for accomplishing a result of data privacy management utilizing sketch generation and mapping formation. In portions of the following discussion, reference is made in parallel to FIG. 6 along with a discussion of corresponding systems.

Figure 2:
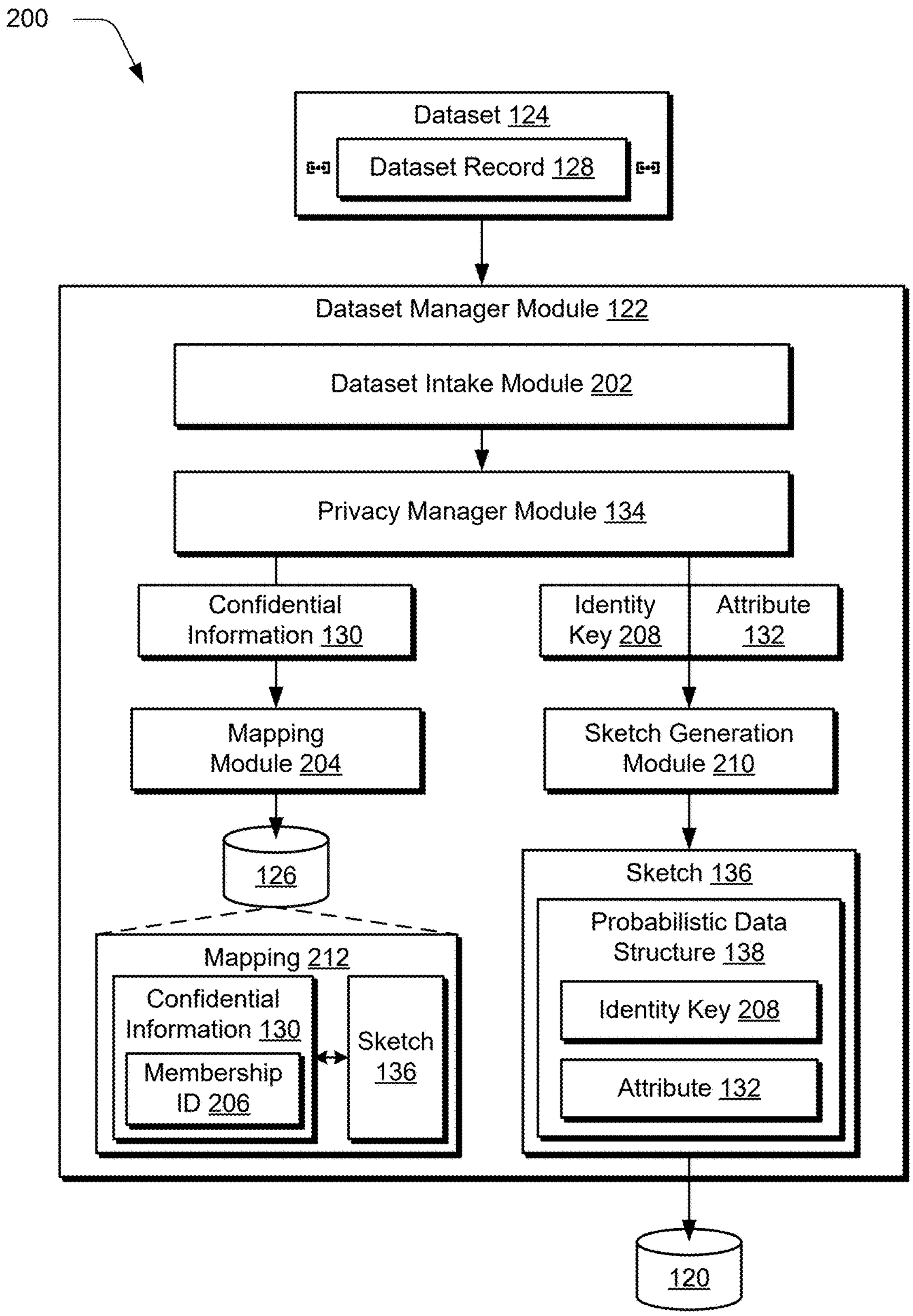
FIG. 2 depicts a system in an example implementation showing operation of a dataset manager module of FIG. 1 in greater detail.

FIG. 2 depicts a system 200 in an example implementation showing operation of the dataset manager module 122 of the computing device 104 of FIG. 1 in greater detail. In this example, a data intake module 202 of the dataset manager module 122 receives a dataset record 128 (block 602), e.g., as part of a dataset 124. The dataset 124 may take a variety of forms, such as a comma separated value (CSV) file or other structure including a table. Other unstructured examples are also contemplated, e.g., in which a structure is then derived through additional processing using machine learning upon intake of the structured data. The data intake module 202 may therefore process the dataset 124 into a form that is compatible with the privacy manager module 134.

The privacy manager module 134 is then employed to filter confidential information 130 from the dataset record 128 (block 604). Each dataset record 128, for instance, includes a column having a corresponding identity key and attributes having data values within the column. The dataset record 128 also includes confidential information 130 associated with the attributes (e.g., as row-level data), e.g., identifying entities associated with the attributes as membership IDs. The membership IDs, for instance, are usable to identify respective user populations.

Accordingly, the privacy manager module 134 is configured in this example to filter the confidential information 130 from the dataset record 128 to form a redacted dataset that does not include the confidential information 130. The confidential information 130 is illustrated as being passed to a mapping module 204. As previously described, the confidential information 130 may take a variety of forms, such as a membership ID 206 as depicted in FIG. 2. An identity key 208 identifying a respective column of the dataset record 128 and associated attribute 132 taken from the dataset record 128 are passed as the redacted dataset by the privacy manager module 134 to a sketch generation module 210. Thus, the sketch generation module 210 in this example does not have access to the confidential information 130 when creating a sketch 136.

The sketch generation module 210 is configured to generate a sketch 136 as a probabilistic data structure 138 (block 606) independent of the confidential information 130. The probabilistic data structure 138, for instance, is based on the identity key 208 and the attribute 132 and is independent of the membership ID 206. Further, the attributes 132 in these examples are not sampled through use of the probabilistic data structure 138, but rather included in their entirety thereby improving accuracy over conventional techniques. Further discussion of sketch 136 generation by the sketch generation module 210 is described in relation to FIGS. 3-5 in the following discussion.

The mapping module 204 is configured to form a mapping 212 between the confidential information 130 and the sketch 136 (block 608). The mapping 212 is usable to resolve what confidential information 130 (e.g., the membership ID 206) corresponds with the sketch 136. The mapping 212 is maintained in storage device 126 locally at the computing device 104 and is not exposed outside of the computing device 104 in this example, thereby protecting the confidential information 130 from compromise by malicious parties.

The mapping 212 is therefore usable to resolve identification of a particular sketch 136 in a probabilistic result to a query processed by the database service 116 when received at the computing device 104. In this way, the database service 116 does not receive the confidential information 130 and thus is unable to determine an identity of the membership ID 206, thereby preserving privacy of a corresponding entity.

The sketch generation module 210 is configurable to leverage internal data structures for different types of data as part of generating the sketch 136. The sketch generation module 210, for instance, is configurable to detect a type of data included in the dataset record 128 to leverage an internal data structure that is selected based on that data type to form one or more sketches 136.

The sketch generation module 210, for example, is configured to identify each column in the dataset 124 (e.g., "i0," "i1," "i2") having an associated identity key 208 (e.g., column header) of the dataset record 128 and associated attribute 132 with a membership ID 206 supplying row-level information. The sketch generation module 210 is configurable to identity a threshold number (e.g., "k") of distinct values based on saliency, i.e., the "most salient" values. The value of the threshold number may be based on a variety of considerations, examples of which include storage and query considerations.

Different data types in this example involve different techniques used by the sketch generation module 210 to form the sketch 136 and thus different internal data structures. For categorical string values, for instance, the sketch generation module 210 identifies the "top k" strings that have a highest amount of cardinality in a subject column, with other string values being grouped together, e.g., as "other." Thus, the sketch generation module 210 detects that the database record 128 involves categorical strings and, responsive to the detecting, identifies a threshold number of the categorical strings based on cardinality. The sketch generation module 210 then forms a number of sketches 136 based on the threshold number of categorical strings. One or more of the categorical strings that are not included in the threshold number are grouped together.

In another example, the sketch generation module 210 detects that the dataset record 128 involves numerical values. In response, the sketch generation module 210 identifies a threshold number of the numerical values that are used to form the sketch 136 or "bucketizes" the numerical values into a "k" number of buckets for inclusion in the sketch 136.

Figure 3:
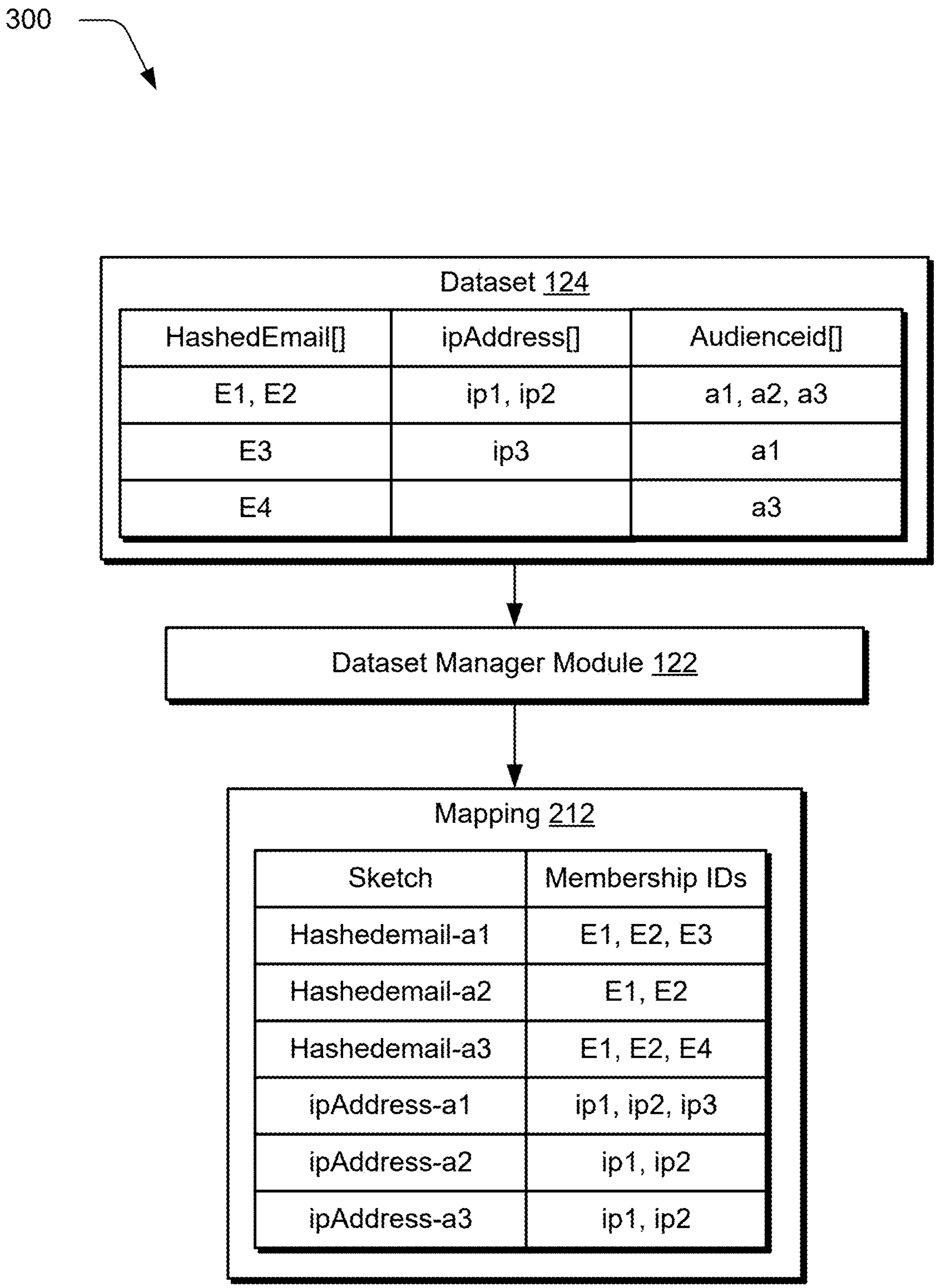
FIG. 3 depicts a system in an example implementation showing operation of a dataset manager module of FIG. 2 in greater detail as forming a sketch and corresponding mappings with respect to confidential information indicating which entities are associated with the sketches.

FIG. 3 depicts a system 300 in an example implementation showing operation of the dataset manager module 122 of FIG. 2 in greater detail as forming a sketch and corresponding mappings to confidential information indicating which entities are associated with the sketches. The dataset 124 includes three columns in this example, the "hashEmail[ ]" and "ipAddress[ ]" as examples of identity keys, while the "audienceid[ ]" column includes membership IDs, and values of respective attributes 132 included in respective columns. Therefore, audienceID[ ] "a1" is associated with hashedemails[ ] "E1, E2, E3." Likewise, a hashed email "E3" and a corresponding IP address "ip3" is associated with audience "a1."

In this example, the membership ID 206 is a simple string having a categorical value indicating membership of an audience with respective attributes in columns associated with respective identity keys. Therefore, the sketch and members illustrated in the mapping 212 enumerate different combinations of hashed emails and IP addresses associated with respective audiences.

Representation of various probabilistic data structures are denotable using a hash, for example, in which the hashed email is used as an identity key for an audience to be indicated by the sketch. Therefore, each hashed email associated with audience "a1" is grouped and used to create a "clean" sketch representation for "a1." Membership IDs indicate "E1," "E2," and "E3" are members of the corresponding sketch, e.g., "hashEmail-a1" as illustrated. This process is also repeated for the IP addresses in the illustrated example.

In this way, the rows and columns are effectively pivoted into a sketch-based inverted index. The mapping 212 therefore provides a cross reference between the sketch and corresponding membership IDs that is usable to resolve which entities associated with respective membership IDs are associated with respective sketches 136 without exposing this relationship outside of the computing device 104.

FIG. 4 depicts a table 400 in an example implementation showing types of sketches generated for respective data types by a dataset manager module 122. As previously described, the dataset manager module 122 is configured to employ internal data structures as a guide to sketch generation. Therefore, the dataset manager module 122 is configurable to select from a plurality of internal data structures based a data type to be processed to form a respective sketch 136. In this way, the dataset manager module 122 is configurable to generate sketches 136 having a variety of configurations.

In a first example of a "categorical" data type, sketches are generated that support "membership querying," "cardinality estimators," and "similarity checks." For a second example of a "categorical number" data type, sketches are also generated that support "membership querying," "cardinality estimators," and "similarity checks." In a third example of "continuous valued" data type, sketches are generated that support "membership querying," "cardinality estimators," "similarity checks," "frequency estimators," and "rank estimators." In this way, the internal data structures act as a guide in sketch generation by the dataset manager module 122. A variety of other examples are also contemplated.

For a simple scenario that does not involve dimensionality of the designated values, the following operations are performed by the dataset manager module 122, and more particularly the sketch generation module 210:

For each row in the dataset 124:
- For each audience "Ai" in audience list (A1, A2, . . . , An);
  - For Identity Type in [HashedEmail, ipAddress];
    - Add each of the IDs of "IdentityType" in row to "Ai-Identity type" sketch.

This results in the creation of sketches as variations of cardinality estimators, e.g., Theta Sketches, HyperLogLog, and Membership based sketches such as Bloom filters on an audience ID/identity type granularity. In this example, the audience ID maps to a categorical type.

FIG. 5 depicts an example implementation 500 of sketch generation by a dataset manager module 122 that addresses dimensional values in a dataset 124. In a scenario involving dimensional values, in addition to the audience data, extra dimensional information is added to provide additional information. In the illustrated example, "Hashed Email" is associated with additional information including "age,"

"gender," and "preferences[ ]." Therefore, data types for "age" include "categorical number," for "gender" include "categorical," and for "preferences" include "categorical."

The granularity of sketches generated by the dataset manager module 122 is configurable as a combination of audience ID, identity type, dimension name, and dimension discretized value. The following operations are performed by the dataset manager module 122, and more particularly the sketch generation module 210:

For each row in the dataset 124:
  For each audience "Ai" in audience list (A1, A2, . . . , An);
    For Identity Type in [HashedEmail, ipAddress];
      Add each of the IDs of "IdentityType" in row to "Ai-Identity type dimension value" sketch.

In a scenario involving continuously valued data, the sketch generation module 210 preprocesses and discretizes the data in terms of percentiles "p0," "p10,", "p20," . . . , "p90," "p100" where "p100" is a maximum value and "p0" is a minimum value. This permits the sketch generation module 210 to discretize the continuously valued attributes into buckets, i.e., "bucketize" the values of the attributes.

For a timeseries data type, the dataset 124 includes a timestamp column and corresponding data that is a subject of the timestamp. Therefore, each row of the dataset 124 may include the following:

Identity type, e.g., hashed email, IP address that generated the data;
Timestamp of the event;
Metric, e.g., sum of impressions;
Metric value; and
Optional dimensional fields such as "adset," "adgroup," and so on.

The following operations are performed by the dataset manager module 122, and more particularly the sketch generation module 210 in a timeseries scenario:

For each row in the dataset 124:
  For each metric "Mi" in a metric list (M1, M2, . . . , Mn);
    For Identity Type in [HashedEmail, ipAddress];
      For each dimension field:
        For distinct metric aggregation value:
        Add each of the IDs of Identity Type in row to date-hour-identitytype-metric-Metric-value-dimension-value sketch.

The granularity of the sketches in this scenario supports queries such as "find a sum of each of the impression that occurred on 26 August Hour 2 for hashed emails" which would cause the database service 116 to return a corresponding sketch as a probabilistic result. Of note, the distinct value of the metric value is also encoded in the sketch in this example without sampling, which increases accuracy over conventional sampling based techniques.

Returning again to FIG. 2, the sketch 136 is then communicated for storage in a database 120 having probabilistic data structures 138 that supports a probabilistic result to a query operation. The sketch 136 is configured to be stored independent of identification of the entity (block 610) within a database having probabilistic data structures 138. In this way, the confidential information 130 is not exposed outside of the dataset manager module 122 and the service provider system 102.

Figure 7:
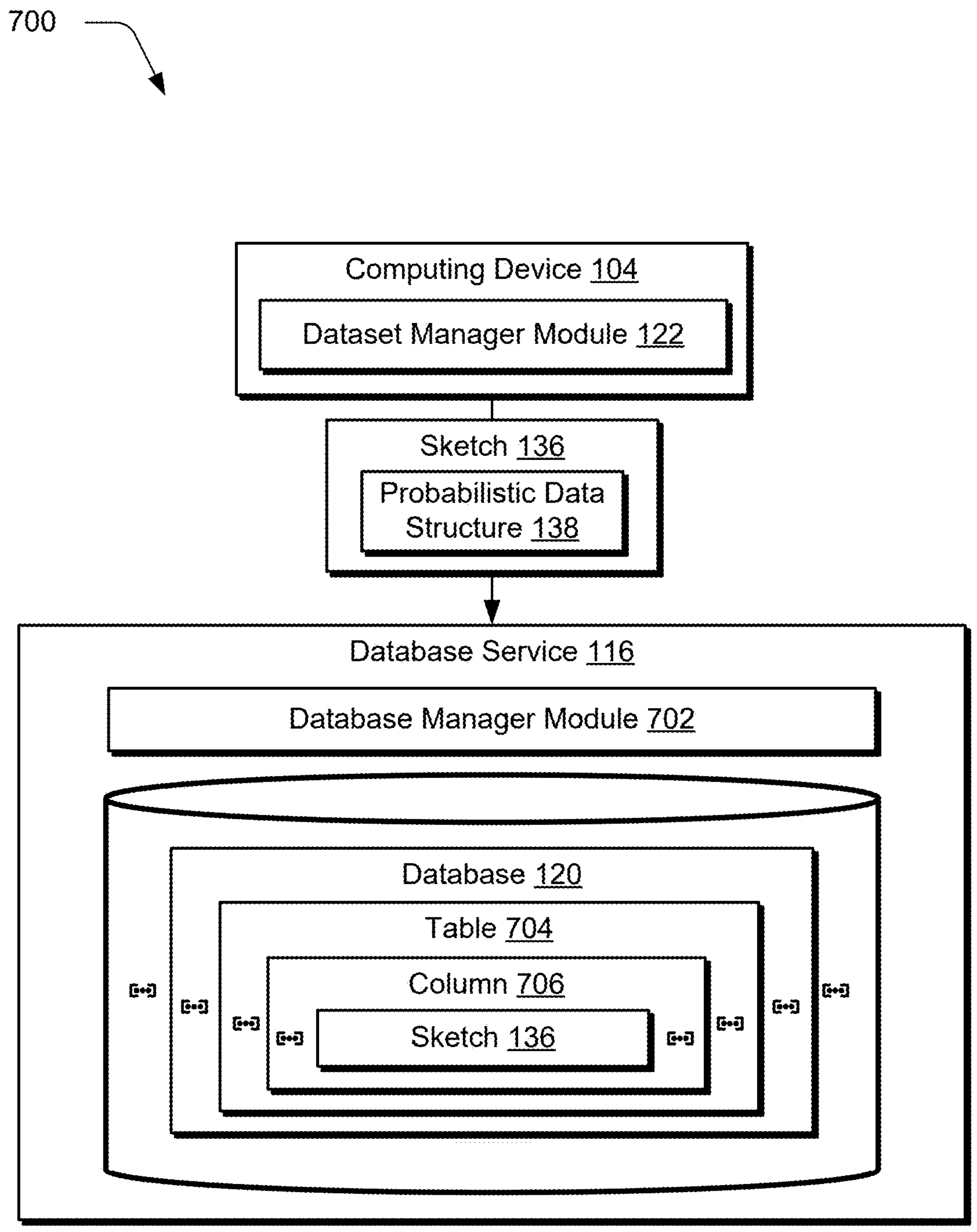
FIG. 7 depicts a system in an example implementation showing a database structure of a database having probabilistic data structures of FIG. 1 usable to maintain a sketch from a computing device without exposing confidential information.

FIG. 7 depicts a system 700 in an example implementation showing a database structure of the database having probabilistic data structures 138 usable to maintain a sketch 136 from a computing device 104 without exposing confidential information. The database service 116 includes a database manager module 702 configured to process queries using the database 120 and return probabilistic results to the queries using the sketches 136.

Each database service 116 includes one or more databases 120 having probabilistic data structures 138, in which each database 120 has probabilistic data structures 138 including one or more tables 704 having one or more columns 706 that are represented, respectively, using one or more sketches 136. This structure supports flexible creation of spaces for storing logically separated datasets and also supports schema definitions at a table/dataset level. The structures also support access controls. A schema of the tables 704 may be defined during design phase of the database 120 having probabilistic data structures 138 or auto inferred during loading of a dataset 124 to the table 704 by the database manager module 702.

Conventionally, a relational database is based on a mathematic notion of a set and corresponding set operations. The database 120 having probabilistic data structures 138 as described herein relies on a construction of a set using a sketch 136. A sketch 136, as previously described, is a probabilistic data structure that does not store individual dataset records 128 and thus does not record record-level identity, i.e., the membership ID or other confidential information. Although use of the sketch 136 and database 120 having probabilistic data structures 138 has been described for use in data privacy management, these techniques are also applicable to generic datasets 124 as well.

Figure 8:
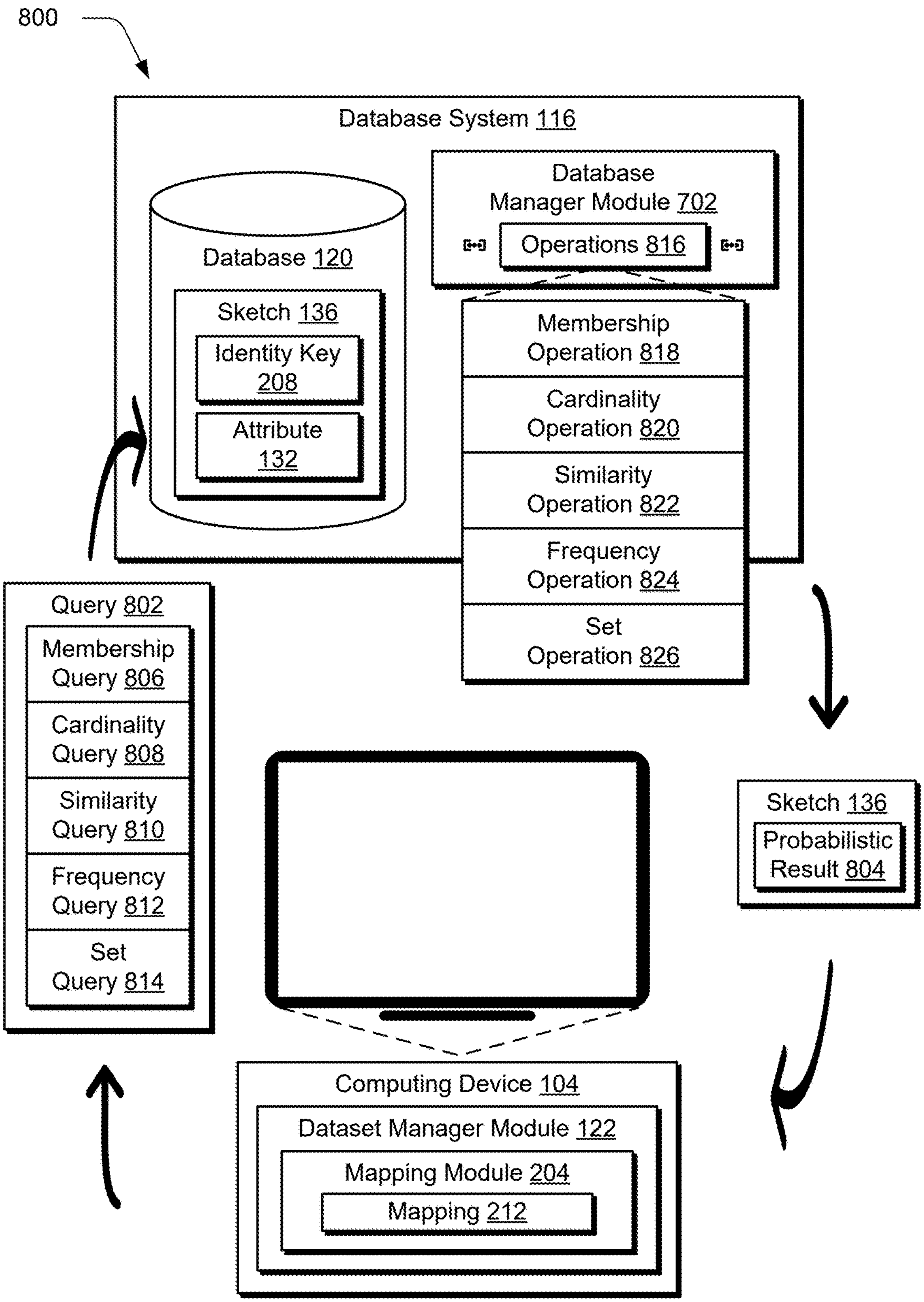
FIG. 8 depicts a system in an example implementation showing generation of a query by a computing device and generation of a probabilistic result as a response to the query by the database system.

FIG. 8 depicts a system 800 in an example implementation showing generation of a query by a computing device and generation of a probabilistic result as a response to the query by the database service 116. In this example, the dataset manager module 122 is employed by the computing device 104 to generate a query 802. The database manager module 702 of the database service 116 then processes the query 802 using the database 120 having probabilistic data structures 138 to generate a probabilistic result 804. The response in the illustrated example includes a sketch 136 having the probabilistic result 804 that is selected and/or generated based on the query 802.

The query 802 is configurable in a variety of ways. In a first example, the query 802 is a membership query 806. The membership query 806 is usable to pose a question such as "is a particular ID present in a set?" e.g., using a Bloom filter as the probabilistic result 804. In a second example, the query 802 is configured as a cardinality query 808. A cardinality query 808 is usable to pose a question such as "How many IDs are present in a set?" with a probabilistic result 804 as a Theta Sketch, HyperLogLog, HyperLogLog++, and so on.

In a third example, the query 802 is configurable as a similarity query 810 structured to pose a question of "how similar are two sets?" A response to the query is formable using a MinHash as the probabilistic result 804. In a fourth example, the query 802 is configured as a frequency query 812 that is configured to pose a question such as "What is the frequency of occurrent of a particular event?" A response to the query is formable using a Count-Min sketch.

These queries support a variety of use cases. In a customer dataset example, the queries support materialization. For example, given a sketch and a list of identities, materialize a sketch as a set of identities that represent an audience corresponding to the sketch. To do so, the database manager module 702 performs repeated membership lookups and queries against the sketch.

In another example, an estimate of the cardinality of an audience set size is queried, in which the audience is represented using a corresponding sketch 136. In a further example, given two audiences (e.g., audience "A" and audience "B"), each as a respective sketch 136, build a new audience as a union of these two audiences, represented as a respective sketch 136. In yet another example, a look-a-like model is built of a seed audience based on a sketch 136. For frequency and reach, reach and frequency to a desired audience are estimated from advertising logs. A variety of other examples are also contemplated, such as a set query 814 usable to specify a respective set operation such as "union," "intersect," and so forth.

The database manager module 702, therefore, is configurable to perform a variety of operations 816 based on the types of queries received. Illustrated examples of which include a membership operation 818, cardinality operation 820, similarity operation 822, frequency operation 824, set operation 826, and so on. Examples of operations and corresponding outputs include:

isPresent(string element)→Boolean;
union(sketch)→sketch;
intersect(sketch)→sketch;
getEstimatedCardinality→long;
similarityScore(sketch)→double; and
aNotb(sketch)→sketch.

The above examples include instances in which operations involve two or more sketches to generate a new sketch, e.g., union and intersect, a-not-b, and so forth.

A union operation, as an example of a set operation 826, may be performed by the database manager module 702 as a lossless operation through use of a sketch 136. Each of the components represented by the sketches 136, for instance, are added together to produce a lossless version of a net sketch, e.g., through use of Bloom filters, Theta sketches, and so forth.

An intersect operation, on the other hand, may be "lossy." Theta sketches support a native intersect operation, for instance, which is usable to produce a new effective Theta sketch but may include additional error over any predecessors. A native intersect operation does not exist for a Bloom filter. Therefore, a deferred evaluation is performed through use of deferred execution to create a reference to an intersect operation and which Bloom filters are involved in that operation. When such a reference exists, deferred execution is performed by the database manager module 702, e.g., during a "isPresent" check on a sketch 136.

When an actual computation is performed as part of deferred execution, a truth table may be created with execution results, e.g., "isPresent" checks for each entry. In this way, deferred execution is usable to support operations not natively supported by particular types of probabilistic data structures through reference to respective sketches which are then performed at a later point in time, which is not possible in conventional techniques.

Figure 9:
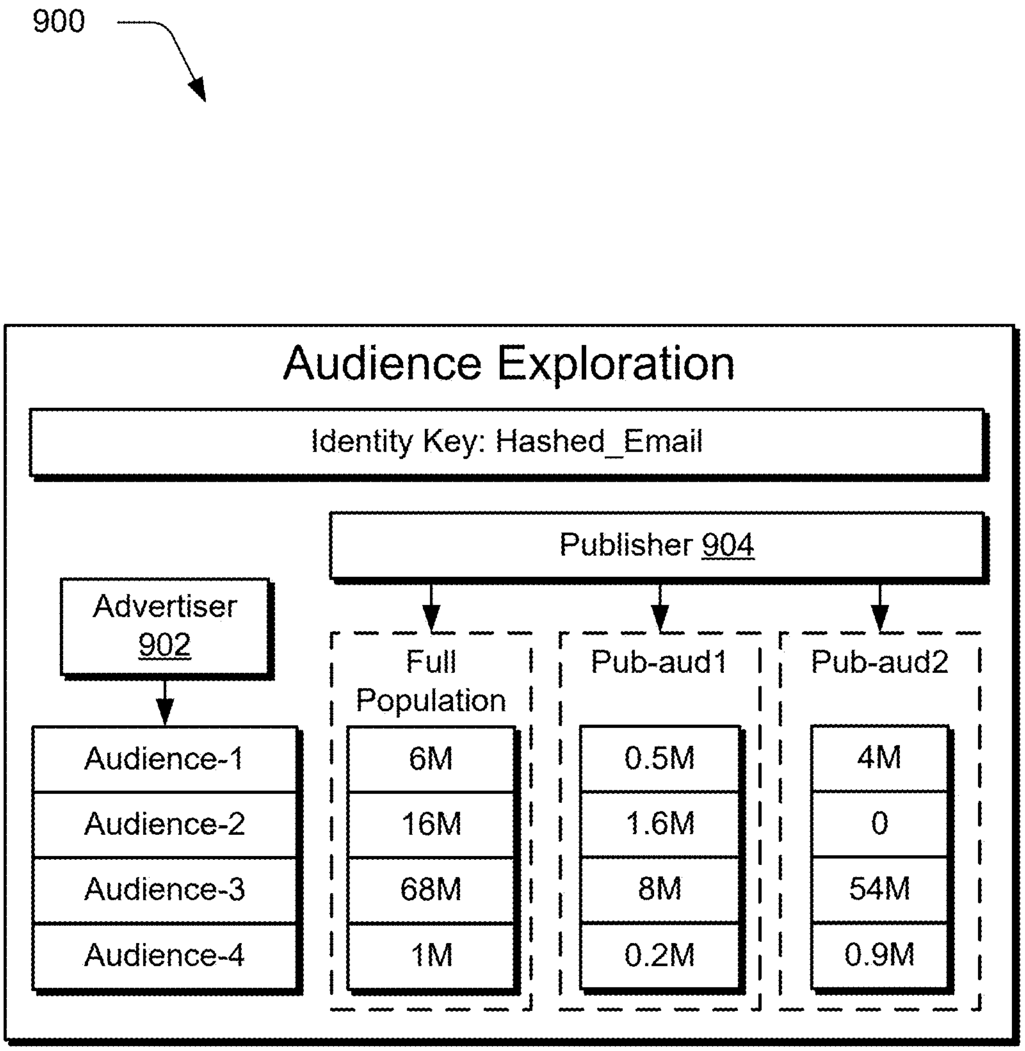
FIG. 9 depicts an example implementation involving audience exploration to determine audience overlaps between an advertiser and a publisher.

FIG. 9 depicts an example implementation 900 involving audience exploration to determine audience overlaps between an advertiser and a publisher. The identity key in this example is "hashed_email" and is based on a comparison of sketches generated, respectively, from datasets of an advertiser 902 and a publisher 904. The advertiser 902 audience (e.g., "a1," "a2," "a3," "a4") is indexed as a sketch 136 "sketch(a(i))" into a database having probabilistic data structures 138. A publisher 904 audience (e.g., "p1," "p2," "p3," "p4"), likewise, is indexed into a sketch and stored in the database having probabilistic data structures 138 as "sketch(p(j))."

In order to compute an overlap of these audiences, a cross product of two arrays of sketches is computed as follows:

```
let identity key=email;
for audience-sketch in [audience1-email-cleanSketch,
  audience2-email-Sketch, . . . ]:
  for publisher-sketch in [publisher-email-fullPopulationSketch, pub-aud1-email-Sketch . . . ]
    audience-sketch.getThetaSketch.intersect(publisher-
      sketch.getThetaSketch)
```

Thus, in this example, a Theta sketch is retrieved from an audience sketch and a publisher sketch to perform the intersection.

In another example involving materialization, the following timeline of events has occurred:

t1—advertiser uploaded audience-a4 with hashed emails as a match key;

t2—advertiser compared a4 with other publisher audiences and chose a4 for activation using the same hashed email identity key; and t3—advertiser materialized a temporary audience temp-audience based off audience-a4.

Audience "a4" is then chosen for materialization by the publisher 904. To do so, the dataset manager module 122 retrieves a sketch 136 associated with the audience for identity key "hashed-email" from the database having probabilistic data structures 138. The dataset manager module 122 then accesses a corresponding probabilistic data structure 138 (e.g., Bloom filter) to generate and iterate through a list of each of the identifiers associated with the publisher 904. If "isPresent" is "yes" then it is added to a temporary activation list that contains the IDs and is sent to the publisher 904. A variety of other examples are also contemplated.

Figure 10:
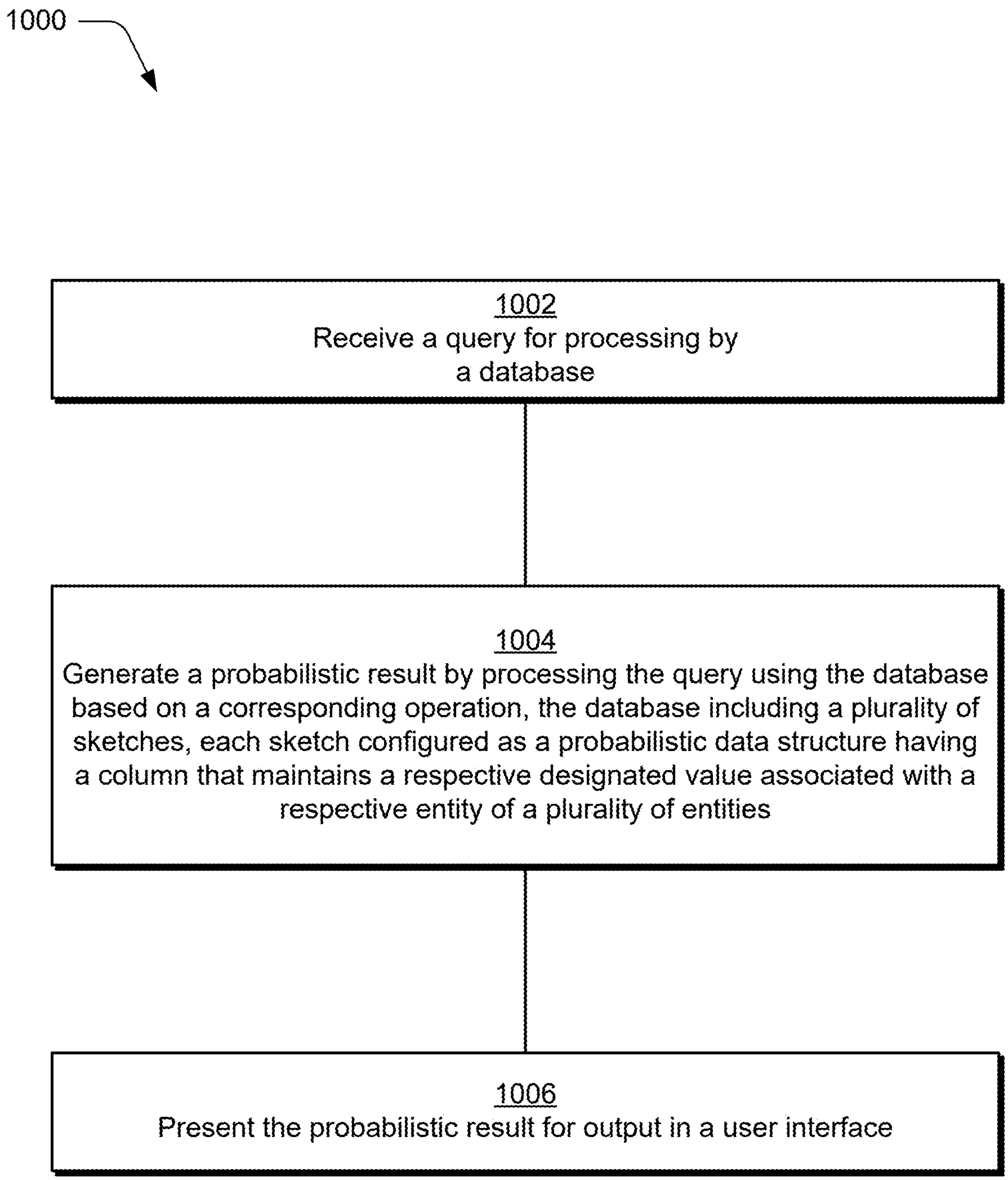
FIG. 10 is a flow diagram depicting an algorithm as a step-by-step procedure in an example implementation of operations performable for accomplishing a result of query processing using a database having probabilistic data structures.

FIG. 10 is a flow diagram depicting an algorithm 1000 as a step-by-step procedure in an example implementation of operations performable for accomplishing a result of query processing using a probabilistic database. A query is received for processing by a database 120 (block 1002). A probabilistic result is then generated by processing the query using the database 120 based on a corresponding operation. The database 120 includes a plurality of sketches, each sketch configured as a probabilistic data structure having a column that maintains a respective attribute associated with a respective entity of a plurality of entities (block 1004). The probabilistic result is then presented for output in a user interface (block 1006).

Example Collaboration System Using Probabilistic Data Structures

The following discussion describes collaboration techniques that are implementable utilizing the described systems and devices through use of a probabilistic data structure. Aspects of each of the procedures are implemented in hardware, firmware, software, or a combination thereof. The procedures are shown as a set of blocks that specify operations performable by hardware and are not necessarily limited to the orders shown for performing the operations by the respective blocks. Blocks of the procedures, for instance, specify operations programmable by hardware (e.g., processor, microprocessor, controller, firmware) as instructions thereby creating a special purpose machine for carrying out an algorithm as illustrated by the flow diagram. As a result, the instructions are storable on a computer-readable storage medium that causes the hardware to perform the algorithm.

Conventional techniques used for digital content control collaboration are implemented directly between two entities and as such do not support multi-entity collaboration. Digital content control, for instance, is usable to generate digital content recommendations, output of emails, instant message, advertisements, and so forth. The entities, for instance, may include an advertiser, a publisher, a data/ID partner, and so forth. Therefore, collaboration in this scenario involves sharing data that identifies items of digital content that are a subject of member interaction as well as identity of the members, themselves. The data, for instance, is shared to determine performance of a digital content campaign with a corresponding publisher. However, as described above this sharing (e.g., audience and conversion data) can lead to privacy concerns that may limit and even prevent cooperation between the entities.

Further, conventional point-to-point conversion limits an ability to compare performance with a plurality of corresponding entities together, e.g., multiple publishers. This limitation may prevent an ability to view optimal insights that can allow rapid changes to a campaign for a better return on investment. In another example, advertisers are tasked in conventional techniques to share data directly with data/ID partners to in turn receive enriched audience data, which may also lead to privacy concerns.

Additionally, conventional techniques used for digital content control may involve collaboration with multi-cloud-providers. Conventional entities are further tasked with obtaining knowledge and operational expertise to support, at scale, each other entity, with which, collaboration is desired. This technical challenge increases significantly if an entity (e.g., advertiser, publisher, or ID partner) adopts a new cloud provider, makes a change to underlying technology offering for a given collaboration, and so forth. The collaborating entities, in conventional scenarios, are therefore forced to utilize a separate implementation per cloud and per entity in a quest to execute optimal performing campaigns while sharing confidential information (e.g., user data) in a variety of non-normalized data formats.

In these conventional techniques, for instance, row level data that contains confidential information (e.g., membership ID) is shared in a repeated fashion for each entity, with which, collaboration is to be performed. Similarly, an entity (e.g., advertiser) that aims to improve match rates may wish to work with different data/ID partners and publishers. Additionally, publishers may support multiple partners.

Further, an advertiser may have different data access points than the publishers. Data access points, for instance, refer to an endpoint and/or technology stack, from which, a dataset is to be obtained. The technical challenge is the same across any type of data access point that an advertiser or publisher may employ, e.g., a data clean room (DCR), a customer data platform (CDP), or conversions API (CAPI—wall garden publishers), and so forth. Additional concerns involve collaboration in a privacy centric manner that are amplified as the sharing of data across parties is forced to also include a repeatable, detailed, and strict implementation to prevent data leakage.

Accordingly, a collaboration system is described that is configured to address these and other technical challenges through use of probabilistic data structures, e.g., sketches. These techniques support collaboration of multiple entities together through a shared environment with zero-data-share. As a result, the collaboration system supports multi-entity collaboration as opposed to conventional point-to-point collaboration.

Collaboration permits entities to view campaign performance, overlap metrics and activate audiences to multiple other entities, e.g., publishers. Materialization (e.g., to resolve membership IDs) and activation are performed, in one or more examples, strictly within a protected environment of the entities and therefore does not involve exposure of the confidential information 130 outside of the protected environment. The collaboration system also supports an escrow-like approach using sketches 136 and the probabilistic data structures 138 for "N" way collaboration at scale, meaning that a collaboration can exist across multiple entities. A participating entity, for instance, is solely tasked with providing intake data regarding where the dataset 124 will be read from, thus making the entity agnostic as to which cloud provider or data access point is used by a target entity.

In the following discussion, onboarding techniques are first described that involve obtaining intake data to setup a particular entity with access to a database service 116. Compute operations are also described within a shared environment (e.g., using operations 816 by a database manager module 702), which may then employ resolution of confidential information (e.g., membership IDs) within respective protected environments. Additional operation techniques include use of a probabilistic response to a query for audience materialization and activation without exposure of confidential information 130 outside of respective protected environments.

Figure 14:
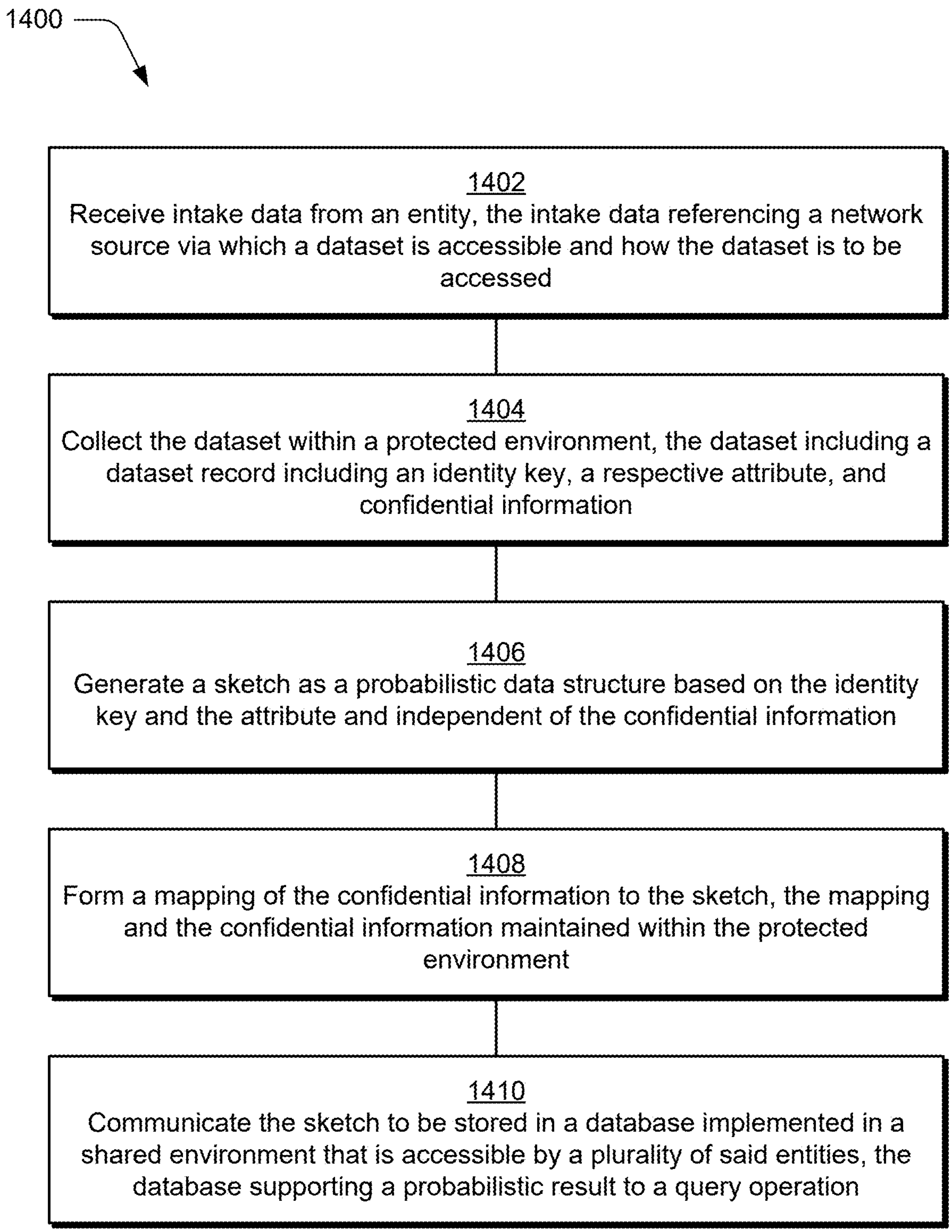
FIG. 14 is a flow diagram depicting an algorithm as a step-by-step procedure in an example implementation of operations performable for accomplishing a result of entity intake by a collaboration system.

FIG. 14 is a flow diagram depicting an algorithm 1400 as a step-by-step procedure in an example implementation of operations performable for accomplishing a result of entity intake by a collaboration system. In portions of the following discussion, reference is made in parallel to FIG. 14 along with a discussion of corresponding systems.

Figure 11:
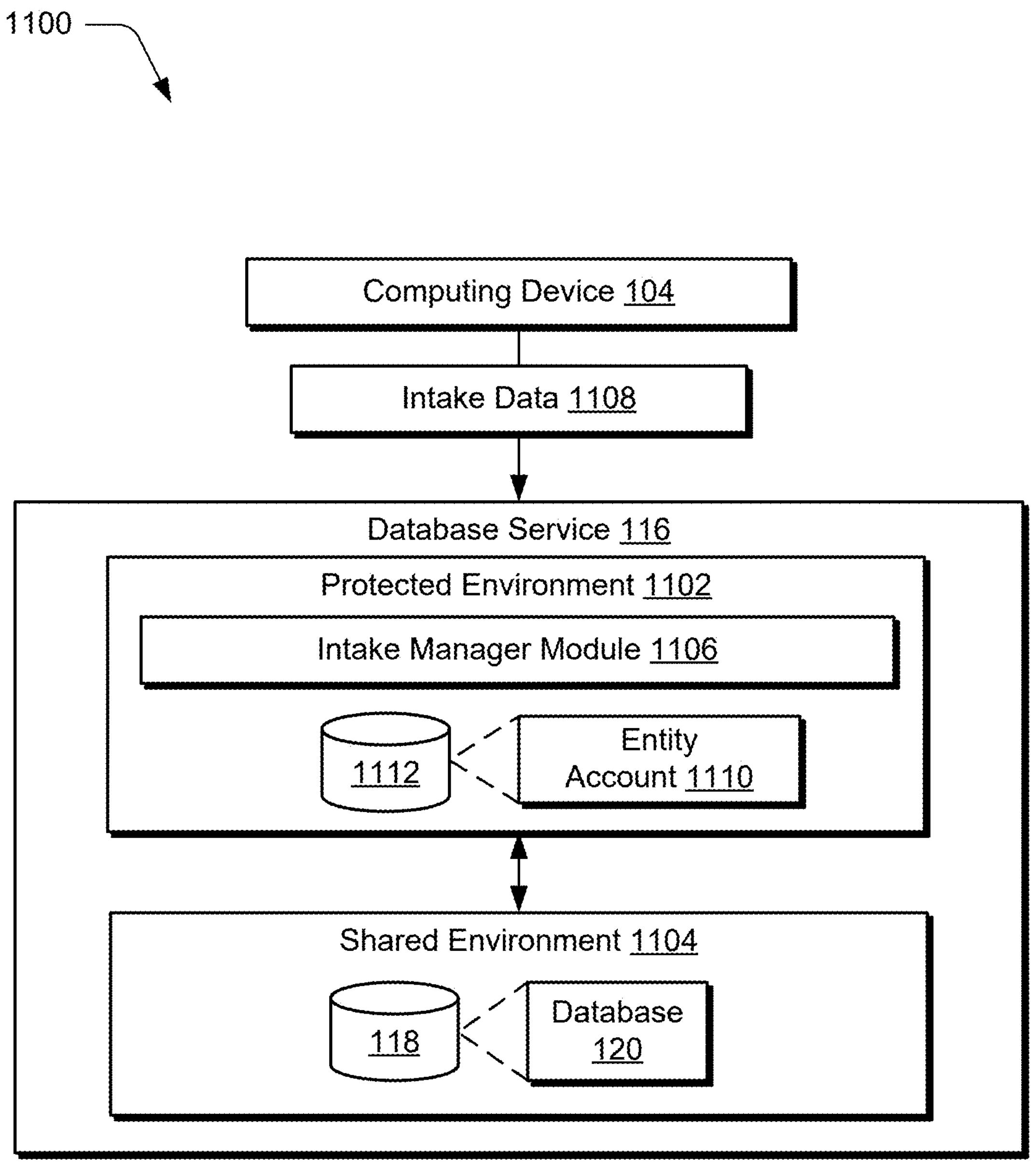
FIG. 11 depicts a system in an example implementation in which a database service implements onboarding and intake as part of a collaboration system.

FIG. 11 depicts a system 1100 in an example implementation in which a database service 116 implements onboarding and intake as part of a collaboration system. The database service 116 in this example includes a protected environment 1102 and a shared environment 1104. The protected environment 1102 is configured to restrict outside access by third parties to data and executable code contained within the protected environment 1102. In contrast, the shared environment 1104 is configured to permit outside access for data collaboration. Examples of a protected environment 1102 include a sandbox, a container, an isolated execution environment, an emulator, and so forth that are executable by a computing device using a processing device and storable using a computer-readable storage medium, e.g., that is non-transitory.

In the illustrated example, an intake manager module 1106 is executed within the protected environment 1102 to receive intake data 1108 from an entity, e.g., a computing device 104. The intake data 1108 references a network source via which a dataset is accessible and how the dataset is to be accessed (block 1402), e.g., a network address, IP address, application programming interface, and so forth. The intake data 1108 is also configurable to specify login credentials that are verifiable to gain this access, referencing data formats supported by the dataset 124 obtained from the network source, and so forth.

In response, the intake manager module 1106 then configures an entity account 1110 (stored in a storage device 1112) which includes forming a protected environment 1102 as associated with the respective entity, e.g., solely, such that outside access is permitted for that entity and other entities that have received permission from the entity. Once the entity account 1110 is formed, the database service 116 is configured to generate a sketch 136 to be maintained within the database 120 of the database service 116.

Figure 12:
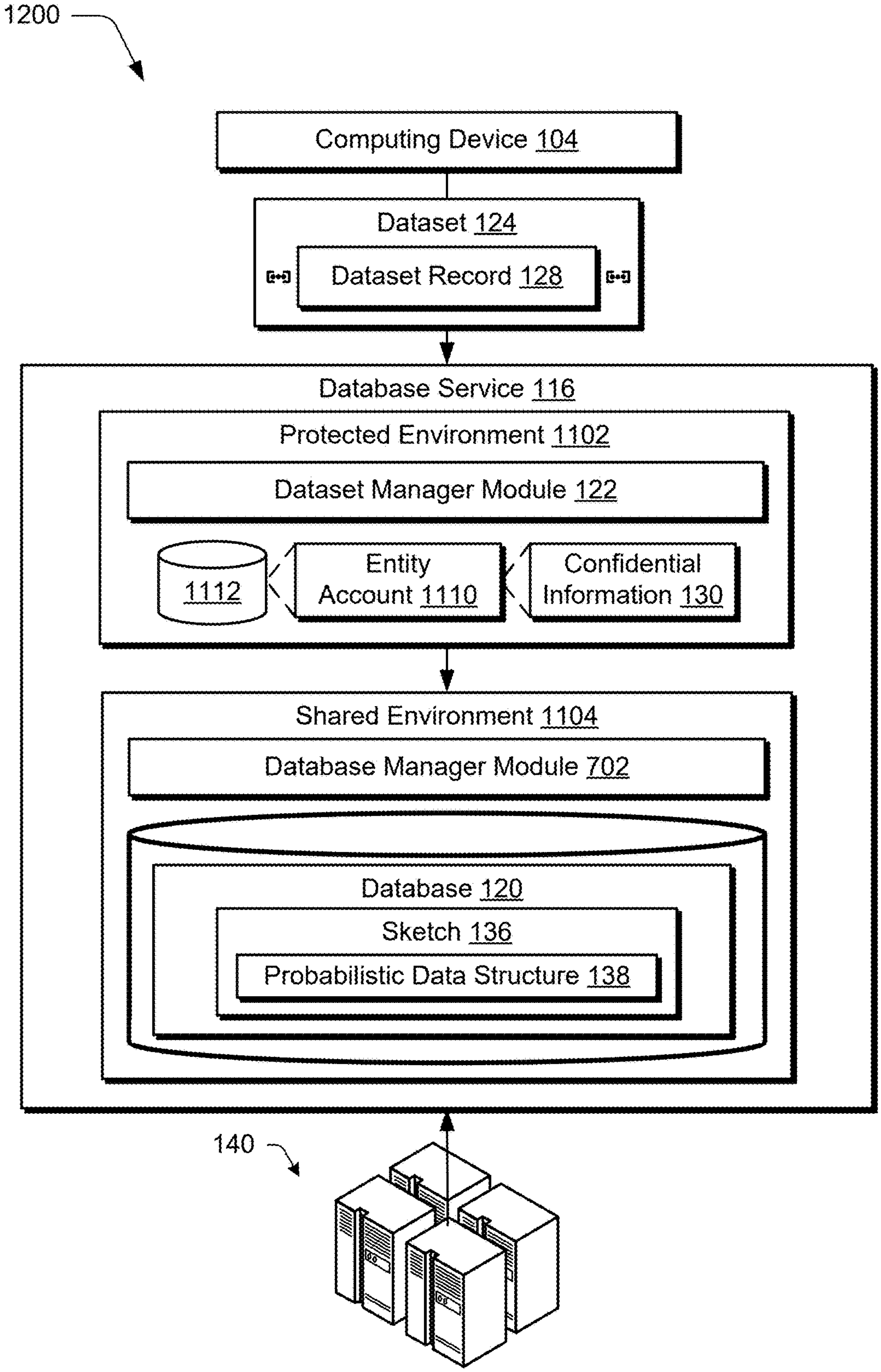
FIG. 12 depicts a system in an example implementation in which a database service implements sketch generation within a protected environment and sketch sharing within a shared environment as part of a collaboration system.

FIG. 12 depicts a system 1200 in an example implementation in which a database service 116 implements sketch generation within a protected environment and sketch sharing within a shared environment as part of a collaboration system. In this example, in contrast to FIG. 2, the dataset manager module 122 is implemented as part of the database service 116 within the protected environment 1102.

The dataset manager module 122 is configured to maintain the confidential information 130 within the protected environment 1102, e.g., within an entity account 1110. The database manager module 702, on the other hand, is executed within a shared environment 1104 to permit sharing of the sketch 136 without exposing the confidential information 130.

Figure 13:
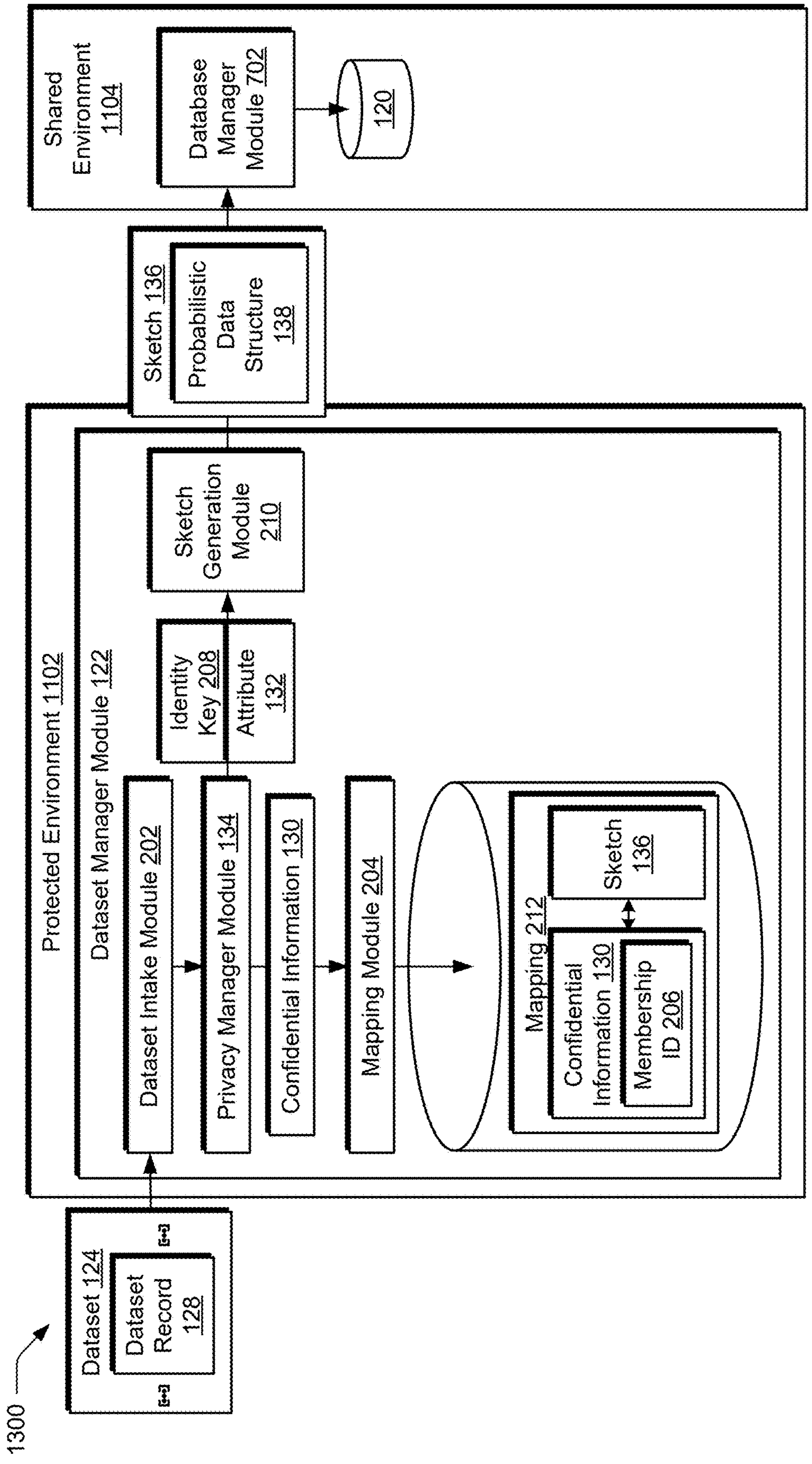
FIG. 13 depicts a system in an example implementation in which a dataset manager module of the database service implements sketch generation within a protected environment.

FIG. 13 depicts a system 1300 in an example implementation in which a dataset manager module 122 of the database service 116 implements sketch generation within a protected environment 1102. In this example, a data intake module 202 of the dataset manager module 122 collects the dataset 124 within a protected environment 1102. The dataset includes 128 a dataset record including an identity key, a respective attribute, and confidential information as previously described (block 1404). The dataset 124 may take a variety of forms, such as a comma separated value (CSV) file or other structure including a table. Other unstructured examples are also contemplated, e.g., in which a structure is then derived through additional processing using machine learning upon intake of the structured data. The data intake module 202 may therefore process the dataset 124 into a form that is compatible with the privacy manager module 134.

The privacy manager module 134 is then employed to filter confidential information 130 from the dataset record 128. Each dataset record 128, for instance, includes a column having a corresponding identity key and attributes having data values within the column. The dataset record 128 also includes confidential information 130 associated with the attributes (e.g., as row-level data), e.g., identifying entities associated with the attributes as membership IDs. The membership IDs, for instance, are usable to identify respective user populations.

Accordingly, the privacy manager module 134 is configured in this example to filter the confidential information 130 from the dataset record 128 within the protected environment 1102 to form a redacted dataset that does not include the confidential information 130. The confidential information 130 is illustrated as being passed to a mapping module 204 within the protected environment 1102. As previously described, the confidential information 130 may take a variety of forms, such as a membership ID 206 as depicted in FIG. 2. An identity key 208 identifying a respective column of the dataset record 128 and associated attribute 132 taken from the dataset record 128 are passed as the redacted dataset by the privacy manager module 134 to a sketch generation module 210. Thus, the sketch generation module 210 in this example does not have access to the confidential information 130 when creating a sketch 136.

The sketch generation module 210 is configured to generate a sketch 136 based on the identity key and the attribute and independent of the confidential information (block 1406). The probabilistic data structure 138, for instance, is based on the identity key 208 and the attribute 132 and is independent of the membership ID 206. Further, the attributes 132 in these examples are not sampled through use of the probabilistic data structure 138, but rather included in their entirety thereby improving accuracy over conventional techniques.

The mapping module 204 is configured to form a mapping 212 between the confidential information 130 and the sketch 136 (block 1408). The mapping 212 is usable to resolve what confidential information 130 (e.g., the membership ID 206) corresponds with the sketch 136. The mapping 212 is maintained in a storage device 126 within the protected environment 1102 and is not exposed outside of the protected environment 1102, thereby protecting the confidential information 130 from compromise by malicious parties.

The mapping 212 is therefore usable to resolve identification of a particular sketch 136 in a probabilistic result to a query processed by the database service 116 when received at the computing device 104. In this way, the database service 116 does not receive the confidential information 130 and thus is unable to determine an identity of the membership ID 206, thereby preserving privacy of a corresponding entity.

The sketch 136, as independent of the confidential information 130, is then communicated by the dataset manager module 122 to be stored in a database 120 within the shared environment 1104 (block 1410). Sharing of the sketches supports a variety of operations without exposing the confidential information 130, which is not possible in conventional techniques.

Figure 16:
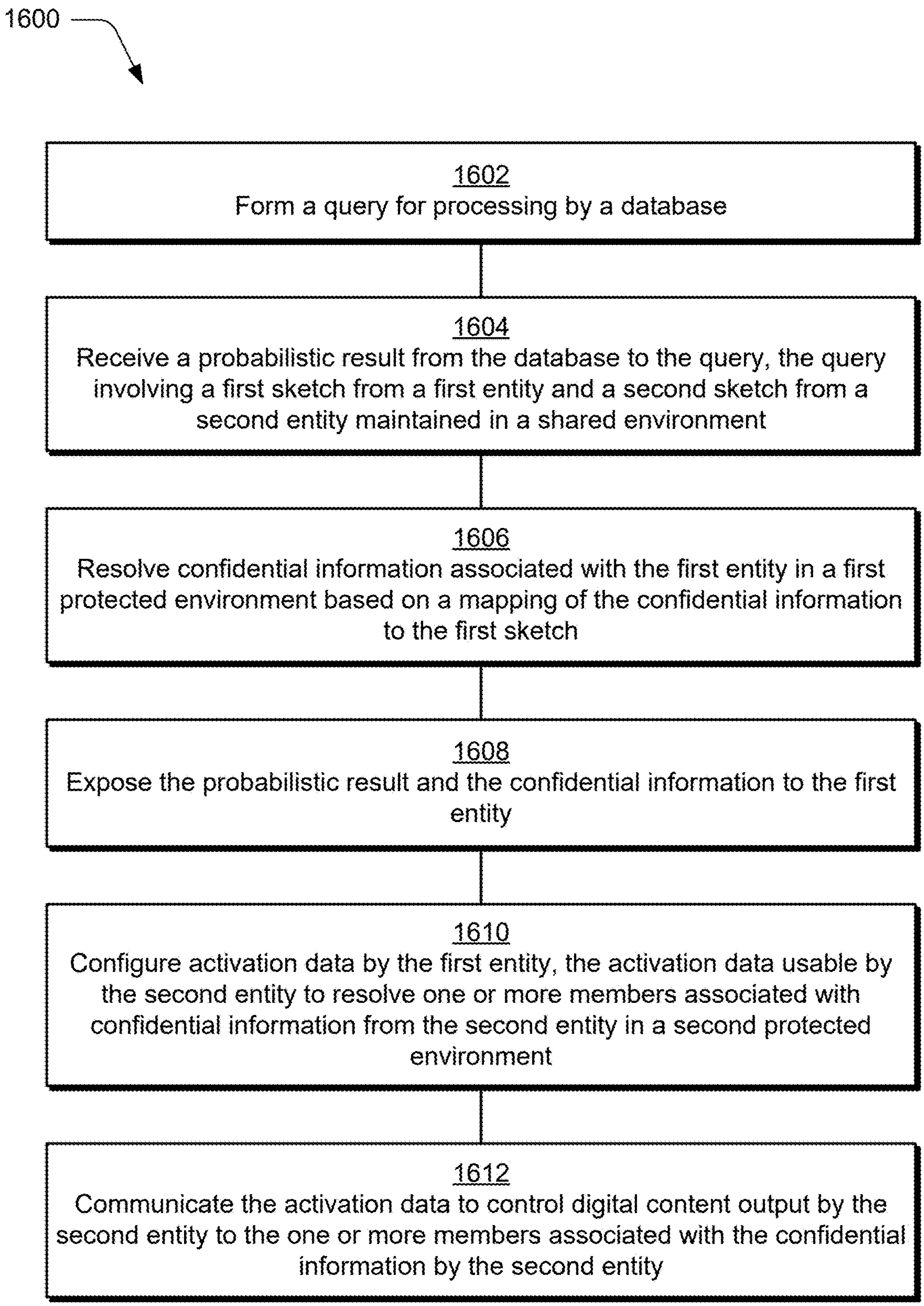
FIG. 16 is a flow diagram depicting an algorithm as a step-by-step procedure in an example implementation of operations performable for accomplishing a result of collaboration between entities using protected and shared environments that leverage probabilistic data structures.

FIG. 16 is a flow diagram depicting an algorithm 1600 as a step-by-step procedure in an example implementation of operations performable for accomplishing a result of collaboration between entities using protected and shared environments that leverage probabilistic data structures. In portions of the following discussion, reference is made in parallel to FIG. 16 along with a discussion of corresponding systems.

Figure 15:
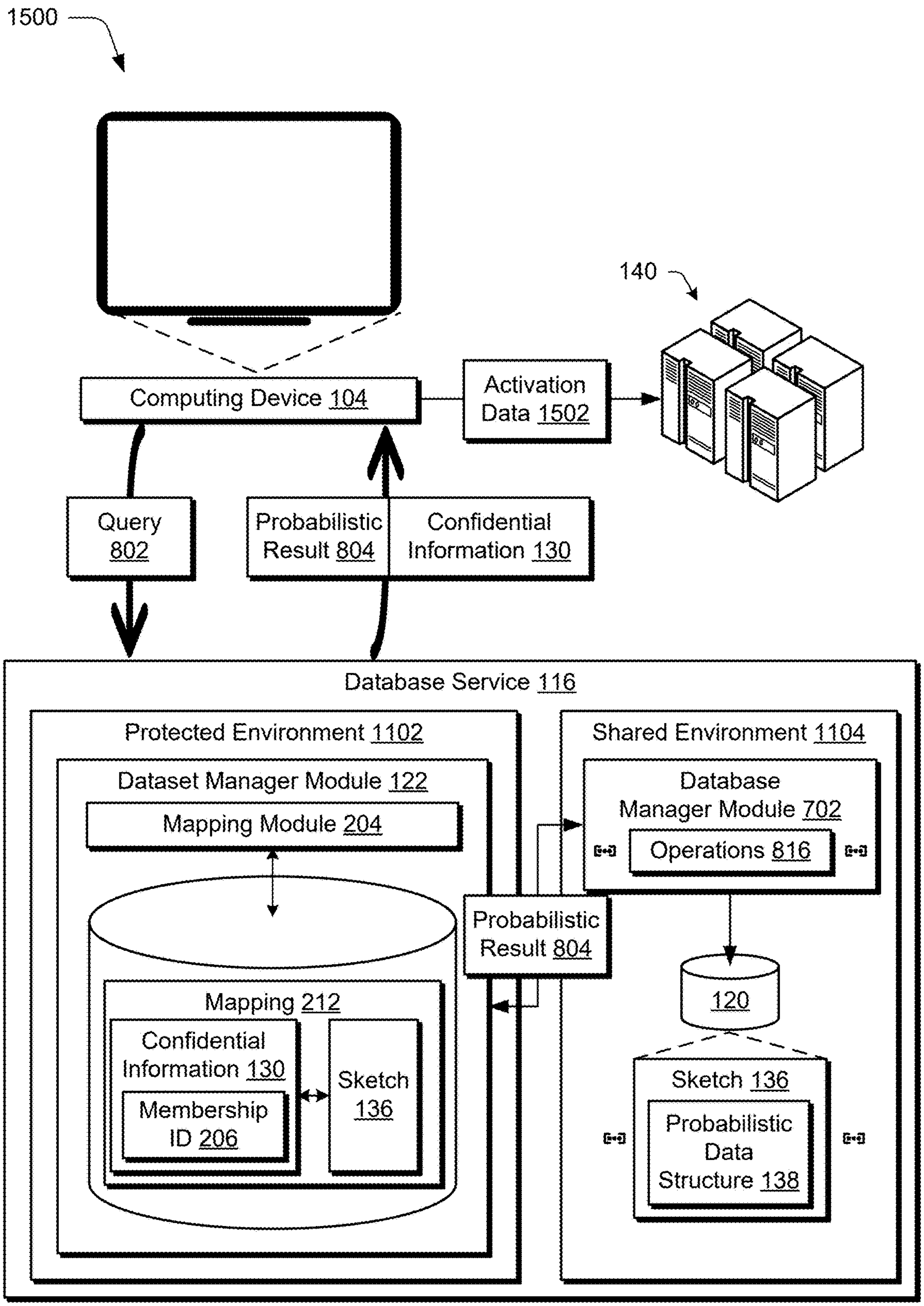
FIG. 15 depicts a system in an example implementation of a collaboration system that supports queries and probabilistic results to the queries without exposing confidential information.

FIG. 15 depicts a system 1500 in an example implementation of a collaboration system that supports queries and probabilistic results to the queries without exposing confidential information 130. This example begins by forming a query by a first entity (e.g., the computing device 104) for processing by a database 120 (block 1602). The query 802 in this example may be passed directly to the database manager module 702 within the shared environment 1104 or indirectly via the dataset manager module 122 within the protected environment 1102, e.g., the entity as "logged in" to an entity account 1110 and thus operates within the protected environment 1102.

The database manager module 702 then processes the query 802 using one or more operations 816 with respect to the database 120. A probabilistic result 804 is generated based on the processing as further described below by the database 120 based on the query 802. The query 802, for instance, may involve a first sketch from a first entity and a second sketch from a second entity maintained in the database 120 of the shared environment 1104 (block 1604), e.g., an intersect operation, a union operation, and so forth. The probabilistic result 804 is then received by the dataset manager module 122 within the protected environment 1102 from the database manager module 702 in the shared environment 1104.

The dataset manager module 122, through use of the mapping module 204, is then configured to resolve which of the confidential information 130 associated with the first entity (e.g., the computing device 104) in a first protected environment (e.g., protected environment 1102) based on a mapping of the confidential information 130 to the first sketch 136 (block 1606). The mapping 212, for instance, is configurable by the mapping module 204 to detect which of the confidential information 130 is represented in a respective sketch 136, e.g., membership IDs. In this way, the first entity is configurable to resolve member identity of known members but is not able to resolve identities of unknow members, e.g., from a second entity associated with the additional computing device 140.

The dataset manager module 122 is then configured to expose the probabilistic result 804 and the confidential information 130 to the first entity (block 1608), e.g., for presentation and display in a user interface. As a result, the computing device 104 is given insight into known membership IDs associated with the probabilistic result 804 and based on this may take a variety of actions.

The first entity associated with the computing device 104, for instance, configures activation data 1502. The activation data 1502 is usable by the second entity (e.g., additional computing device 140) to resolve one or more members associated with confidential information from the second entity in a second protected environment (block 1610). The second entity, for instance, also has an associated protected environment that is inaccessible by the computing device 104 via which a mapping is also maintained such that the second entity may resolve membership IDs known to the second entity.

The first entity may then communicate the activation data to control digital content output by the second entity to the one or more members associated with the confidential information by the second entity (block 1612), e.g., to control output of emails, instant messages, webpages, advertisements, and so forth. The activation data may be communicated directed by the computing device 104 to the additional computing device 140, indirectly through the database service 116 in order to resolve the membership IDs and any other confidential information within a respective protected environment, and so forth.

Thus, in these examples the collaboration system generates sketches for each participant that shares access within the shared environment 1104. The sketches for any entity are generated independently from the generation of any other entity's sketches. Advertisers, partners and publishers, for instance, provide intake data 1108 having associated metadata and location for the data access point from where data access is to be obtain. The intake data 1108 includes an advertiser or publisher's identity keys and the cadence (e.g., periodicity "T") at which sketch generation is to occur. An entity's user data is read once at interval "T" and transformed into a collection of sketches 136 for a given entity.

The data access point employed by the advertiser or publisher may be either by reference or uploaded to a blob storage. The data read by the database service 116 is ephemeral so the reference or uploaded data is deleted after generating the sketches 136 for the entity. In a scenario involving advertiser data enrichment, after the onboarding of an audience completes, the audience identity keys are sent by RTCDP Collaboration to the any specified collaborating partners. The response provided by a partner is read and a sketch 136 is generated for the partner ID (PID).

The collection of sketches 136 generated for an entity are persisted separately for each entity within one or more database 120 associated with the entity. The sketches 136, as previously described, are solely visible to the database service 116 and do not contain confidential information 130 such as member or record level data, e.g., no email IDs, no IP addresses. This partition or area where each of the databases 120 are stored is also referred to as an "ID Free Zone." The ID free zone does not contain membership IDs nor does this area contain any data that would allow membership IDs to be constructed or retrieved.

The database service 116 and database 120 are also operatable independent of awareness of a collaborators technology stack or cloud provider, with which, to collaborate. An advertiser or a publisher, for instance, solely provides a data access point information to the database service 116 and not to their collaborating parties. This agnosticism of other collaborators'technology stack allows the collaboration to exist across many parties at scale. The information and sketches 136 for a given entity are fully independent from any other entity's sketches.

In one or more implementations, DCRs and Publisher CAPIs are usable for providing advertiser campaign performance metrics between a single Advertiser and a single Publisher. Use of the database 120 and sketch 136 having a probabilistic data structure 138 is another such technique that provides overlap metrics, impression frequency, unique user reach and measurement performance metrics. The database service 116 goes beyond a conventional point-to-point solution by allowing for simultaneous collaboration insights that are available at browser hover speed (e.g., near real time) between a single advertiser and multiple publishers and multiple partners. Furthermore, the collaboration can span across multiple cloud providers between collaborating parties.

The database service 116 implements a compute component that is a privacy-centric, zero-data-share implementation as no entity can view or access a different entity's confidential information. Consider a scenario in which an advertiser wishes to view overlap metrics between its audience "a2" and a publisher's audience "p2." The generated sketches are "A2" from the advertiser and "P2" from the publisher, respectively. The computation may be triggered from a UI by the advertiser.

To compute and view the metrics (e.g., as a probabilistic result), the database manager module 702 performs set operations on the sketches 136 by computing the intersection between sketches to create a new result sketch. This operation is executed at browser hover speed and is executed using the probabilistic data structures 138 which do not involve sharing of confidential information 130 between the advertiser and publisher. In this example, once the result sketch, "R1" is calculated, the audience overlap count can be returned to the UI to show the value to the advertiser.

In a scenario involving an act of sharing an audience with a publisher, advertiser exploration within the database service 116 allows the user (e.g., advertiser) to share a computed audience. The resulting audience is "materialized" into a list of membership IDs using the mapping 212. Next, the materialized list of IDs is "activated" by copying them into a location specified by the publisher.

In an advertiser/publisher data onboarding and sketch generation scenario, the database service 116 supports federated access, allowing a participating entity to specify a data access point's location. In addition, each entity may use a different cloud provider. Thus, each entity onboards a corresponding dataset 124 independently from any other entity. For parties that do not have dedicated data access points or do not wish to share their data access point, these entities can also upload the dataset 124 into a dedicated blob storage.

Once the data access point location has been identified, the dataset 124 is read by the dataset manager module 122 which then generates the appropriate entity's sketches 136. The collection of sketches 136 forms an entity's database 120. The sketches are stored independent of any other entity's sketches 136.

In an insights computation scenario, for a given collaboration, insights, including discovery, are computed using set operations against each entity's sketches 136, resulting in a temporary sketch when applicable. The solution allows an entity to scale paid media campaigns across a variety of publishers. The entity can also share their own onboarded audiences or a computed audience across many publishers.

In an audience materialization and activation scenario, an entity that wishes to share an audience can trigger the materialization and activation of said audience in a publisher's protected environment. To do so, using a sketch 136 as a starting point, materialization begins by scanning the dataset 124 in a publisher's environment. The materialization process checks membership existence in the sketch for each user ID, e.g., using the mapping 212. Once each of the members of the sketch have been identified, the membership IDS are temporarily stored.

The next step is to copy the materialized list of membership IDs into a location as specified by the publisher. The location may be a blob storage or simply an audience table, to which, the Publisher grants access. The temporary list of materialized IDs is then deleted immediately after the copy is completed.

The database service 116 and database 120 implement collaboration techniques that are privacy centric by implementing zero-data-sharing of individual user level data between collaborating parties. Sketches 136 are free from individual user level data. The dataset 124 is deleted at generation of the sketch 136 by the database service 116. These techniques support a variety of operations including overlap metrics, impression frequency, unique user reach, and measurement performance metrics based on sketches 136.

The collaboration techniques support "N" way collaboration between advertisers, publishers, ID partners and data partners. This collaboration permits advertisers to plan campaigns and view performance metrics across collaborating parties, including publishers, data partners and ID partners. These techniques also permit collaborating entities to be agnostic of the other entity's cloud-provider and technology stack, which is not possible in conventional techniques.

Audience Analysis System Using Probabilistic Data Structures

The following discussion describes audience analytics techniques that are implementable utilizing the described systems and devices through use of a probabilistic data structure. Aspects of each of the procedures are implemented in hardware, firmware, software, or a combination thereof. The procedures are shown as a set of blocks that specify operations performable by hardware and are not necessarily limited to the orders shown for performing the operations by the respective blocks. Blocks of the procedures, for instance, specify operations programmable by hardware (e.g., processor, microprocessor, controller, firmware) as instructions thereby creating a special purpose machine for carrying out an algorithm as illustrated by the flow diagram. As a result, the instructions are storable on a computer-readable storage medium that causes the hardware to perform the algorithm.

Predictive analytics refers to techniques that leverage historical data, statistical modeling, data mining techniques, and machine learning to make predictions about future outcomes. By analyzing patterns and trends in past data, predictive analytics helps entities forecast potential scenarios and make informed decisions. These techniques are widely used across various industries to identify risks and opportunities, optimize operations, and enhance strategic planning, optimize computational resource allocation, and so forth.

Predictive analytics, for instance, are usable to anticipate user behavior, personalize digital content output, and improve user retention. Techniques such as regression analysis, classification models, and clustering are typically employed in real world examples to uncover relationships within data and predict future trends. These forward-looking techniques enable entities to gain insights usable to inform a decision-making process.

Audience analytics refers to a type of predictive analytics that deals with prediction of actions by an audience, e.g., when exposed to digital content. Accordingly, audience analytics is usable to define a targeted content control strategy to control digital content output to a respective audience, e.g., to make recommendations, target advertisements, fraud prevention, and so forth. Audience analytics, for instance, are usable to define a targeted audience as a segment of a user population based on behaviors, preferences, and demographics, which supports personalized digital content control. As part of this, audience analytics are usable to determine times at which to output digital content, communication channels to be used to communicate the digital content to a defined audience, potential value associated with those communications and analyze performance of a targeted content control strategy.

Conventional audience analysis analytics techniques, however, encounter numerous technical challenges, generally as a result of reliance of these conventional techniques on confidential information. Confidential information, as previously described, often includes sensitive personal data, such as financial details, health records, personally identifiable information (PII), and so on. The misuse or unauthorized access to confidential information can lead to severe privacy breaches by malicious parties, legal repercussions, and loss of consumer trust. Failure to adhere to stringent data protection regulations can result in hefty fines and damage to an entity's reputation. Another technical challenge involving confidential information is that audience analysis in particular can sometimes lead to biased or discriminatory outcomes if the data used is not representative or is inherently biased. For instance, historical data that reflects societal biases can perpetuate those biases, leading to unfair targeting or exclusion of certain entities from a targeted audience.

Figure 17:
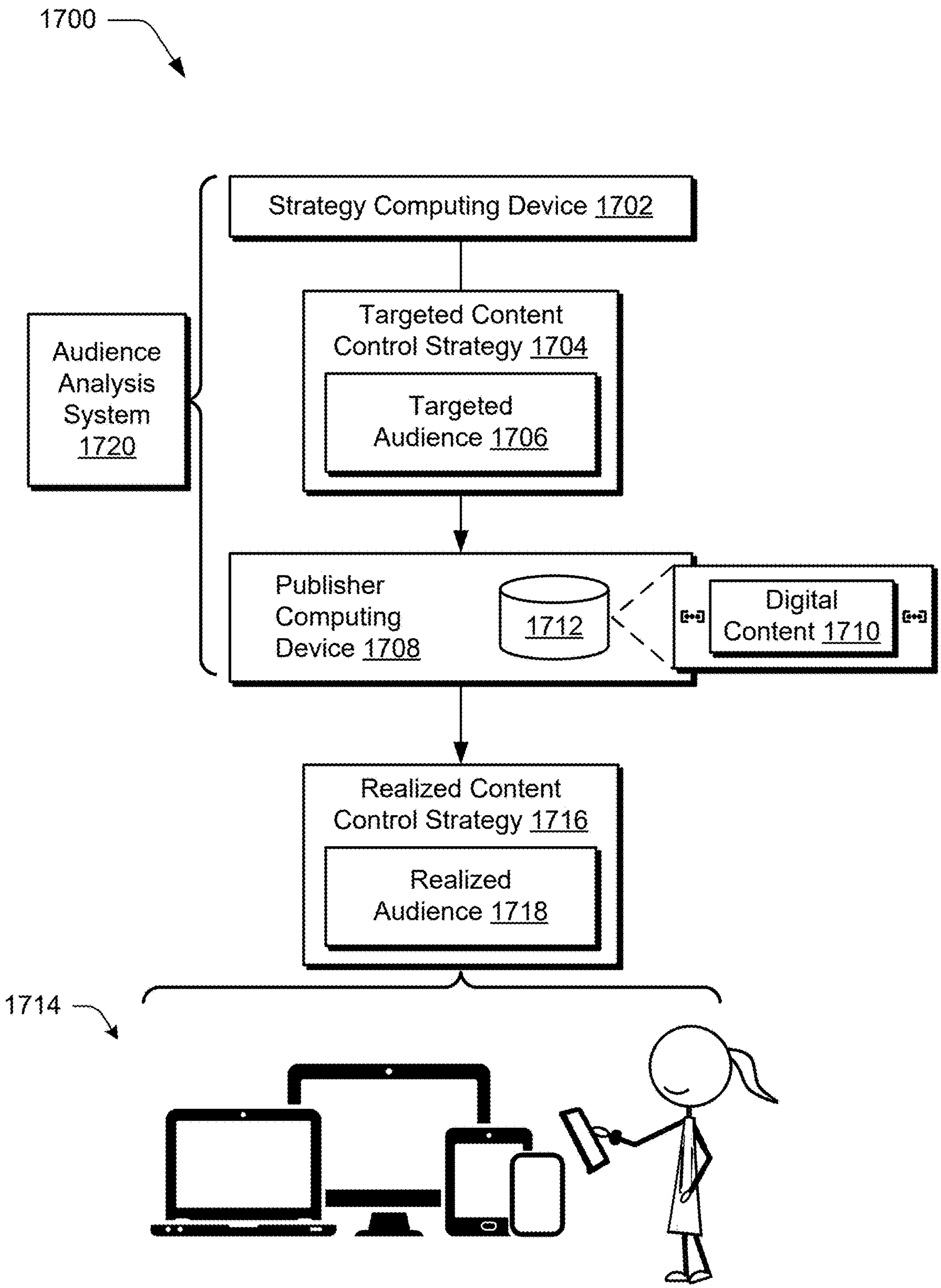
FIG. 17 depicts a system in an example implementation in which a computing device of FIG. 1 is configured as a strategy computing device to target an audience and the other computing device is configured as a publisher computing device that is utilized to implement the strategy.

FIG. 17 depicts a system 1700 in an example implementation in which a computing device 104 of FIG. 1 is configured as a strategy computing device to target an audience and the other computing device 140 is configured as a publisher computing device that is utilized to implement the strategy. The strategy computing device 1702 is representative of functionality usable to generate a targeted content control strategy 1704 (e.g., a campaign) for a targeted audience 1706, e.g., as an advertiser, a recommendation digital service, and so forth.

The strategy computing device 1702, for instance, outputs a user interface that is usable to define a task as a goal of the targeted content control strategy 1704, which may include a marketing goal (e.g., conversion), a hardware device operational goal, and so forth. The user interface is also usable to define a targeted audience 1706 to achieve the goal and/or that is subject to the goal. The targeted audience 1706, for instance, is definable based on criteria such as demographics, purchase history, engagement level, device hardware characteristics, and so forth and therefore membership identifiers associated with those criteria are includable in the target audience 1706. The targeted content control strategy 1704 may also specify additional criteria such as a communication channel to be used (e.g., print, email, webpage, messaging, and so forth), which items of digital content are to be controlled, and so forth.

A publisher computing device 1708 in the illustrated example is configurable to implement the targeted content control strategy 1704 through control of digital content 1710 (illustrated as stored in a storage device 1712) to an audience 1714. In practice, implementation of the targeted content control strategy 1704 by the publisher computing device 1708 results in collection of data as a realized content control strategy 1716 associated with a realized audience 1718.

The realized content control strategy 1716, for example, describes a realized audience 1718 of membership identifiers that actually received the digital content 1710, describes interaction with the digital content 1710 by those membership identifiers, and may include other identifying information, e.g., demographic information. In this way, the publisher computing device 1708 obtains additional insight into how the targeted content control strategy 1704 is implemented, which is usable in support of a variety of functionality as represented by an audience analysis system 1720.

Figure 18:
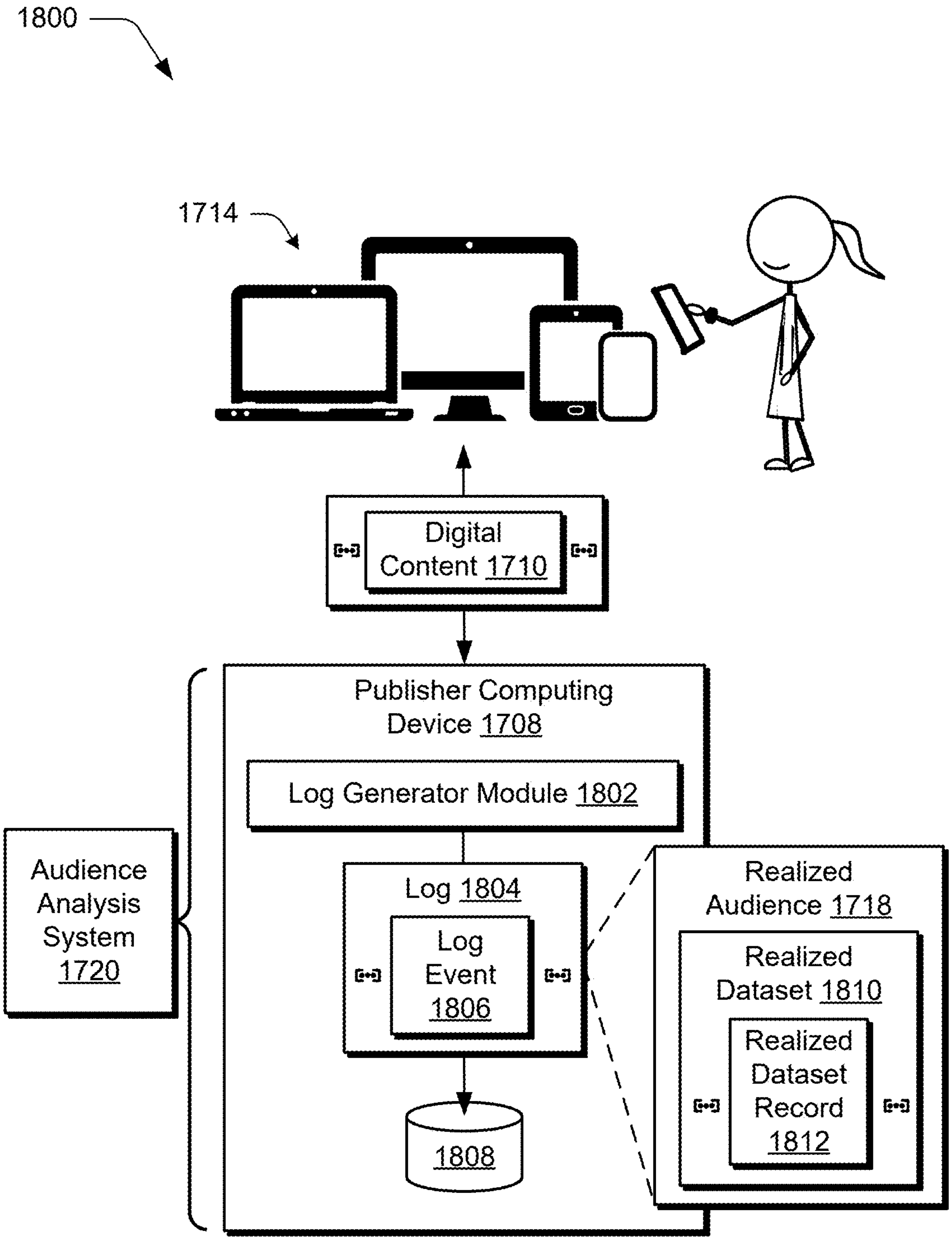
FIG. 18 depicts a system in an example implementation in which a publisher computing device of FIG. 17 generates a realized dataset describing a realized audience.

FIG. 18 depicts a system 1800 in an example implementation in which a publisher computing device 1708 of FIG. 17 generates a realized dataset describing a realized audience. The publisher computing device 1708, for instance, includes a log generator module 1802 that is configured to generate a log 1804 of log events 1806 (stored in a storage device 1808) that describe operation of the targeted content control strategy 1704 as controlling output of digital content 1710 to the audience 1714.

The digital content 1710, for instance, is configurable to employ tagging (e.g., an active pixel) that includes executable code usable to track which items of digital content 1710 are displayed, to whom the digital content 1710 is displayed, demographics associated with the audience 1714 that interacts with the digital content 1710, types of interactions (e.g., clicks, conversions), and so forth.

The log 1804 and associated log events 1806 in this example therefore form a realized dataset 1810 and realized dataset records 1812 that described the realized audience 1718. In conventional techniques, measurement of a targeted content control strategy is performed based on logs collected by publishers, demand-side platforms (DSPs), and so forth. A DSP is an automated software platform configurable as a digital service to purchase opportunities to output digital content, e.g., on websites, mobile applications, streaming platforms, email providers, and so forth. Each log event 1806 is configurable to include data and metrics as well as audience-specific dimensions (e.g., demographics) available at a time of generating the event.

As previously described, conventional techniques often rely on third-party cookies to record these log events. However, increasing privacy regulations restrict use of third-party cookies. Accordingly, numerous technical challenges result from these technical limitations, including hampering of an ability to assess effectiveness of the targeted content control strategy based on audience dimensions. Further technical challenges arise when a single strategy computing device 1702 is tasked with operation involving multiple publisher computing devices 1708, e.g., to normalize data dimensions for consistent measurement.

Take, for example, a shoemaker as associated with the strategy computing device 1702 that is interested in implementing a targeted content control strategy 1704 with the publisher computing device 1708, e.g., as a website. The publisher computing device 1708, through use of the log generator module 1802, is configured to generate a log event 1806 for impressions, engagements, "clicks," and so forth. Due to privacy concerns, conventional techniques shared this data through "clean rooms" which promote privacy by aggregating the log events 1806, which does not support accurate attribution. The publisher computing device, as part of generating the log events, may utilize a variety of dimensions such as state of residence, genre, and so forth. However, the strategy computing device 1702 as the shoemaker may utilize different dimensions, such as sports shoe buyers, mountaineering enthusiasts, and so forth that are not reflected in dimensions used by the publisher computing device 1708.

To address these and other technical challenges, an audience analysis system 1720 is configurable to leverage audience dimensions across multiple publisher computing devices for measuring effectiveness of the targeted content control strategy 1704 while preserving confidential information, which is not possible in conventional techniques. As a result, the audience analysis system 1720 supports a privacy-safe environment through use of shared and protected environments as previously described and may do so independently without use of third-party cookies.

Figure 19:
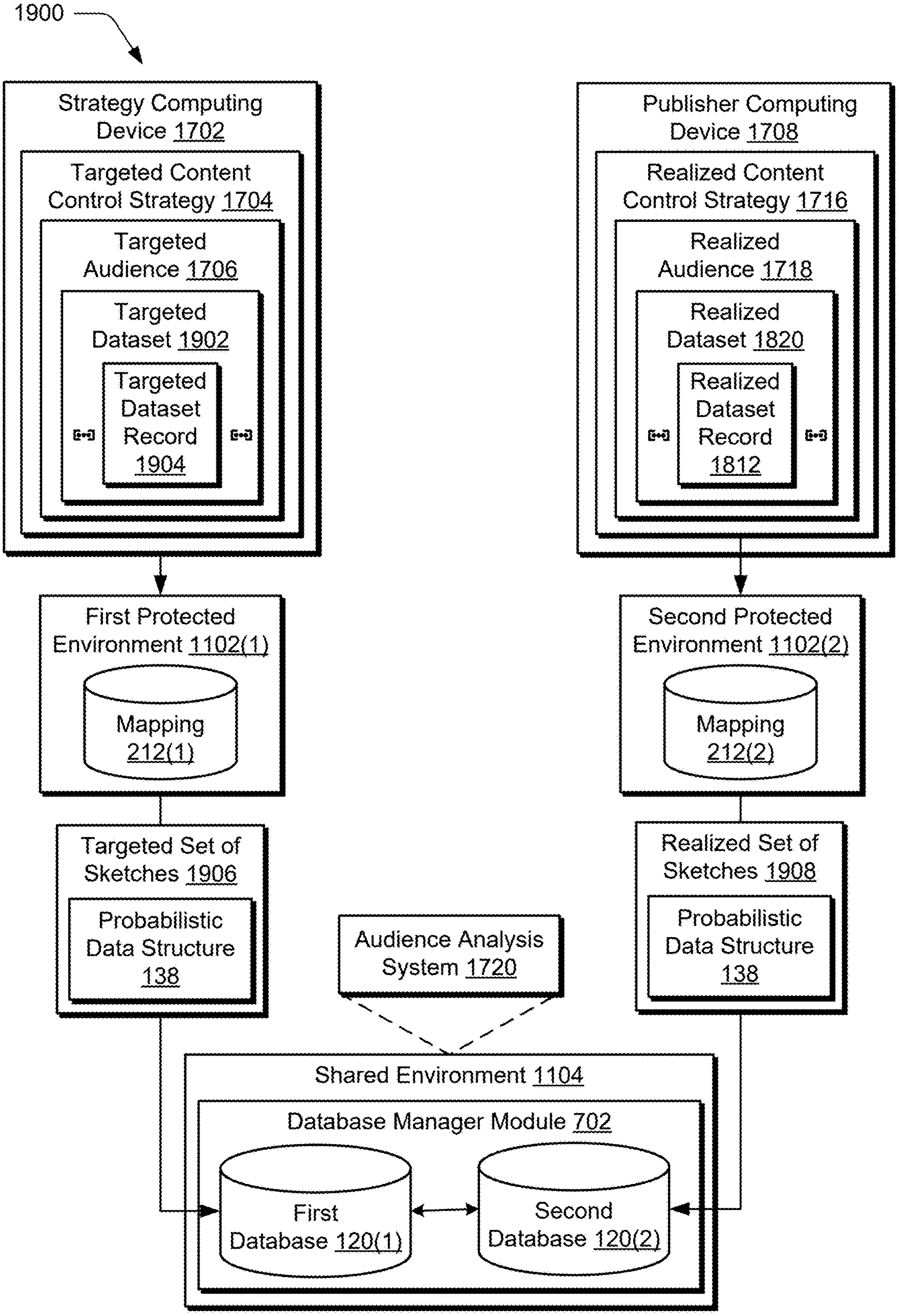
FIG. 19 depicts a system in an example implementation showing sketch generation for a targeted audience and a realized audience.
Figure 20:
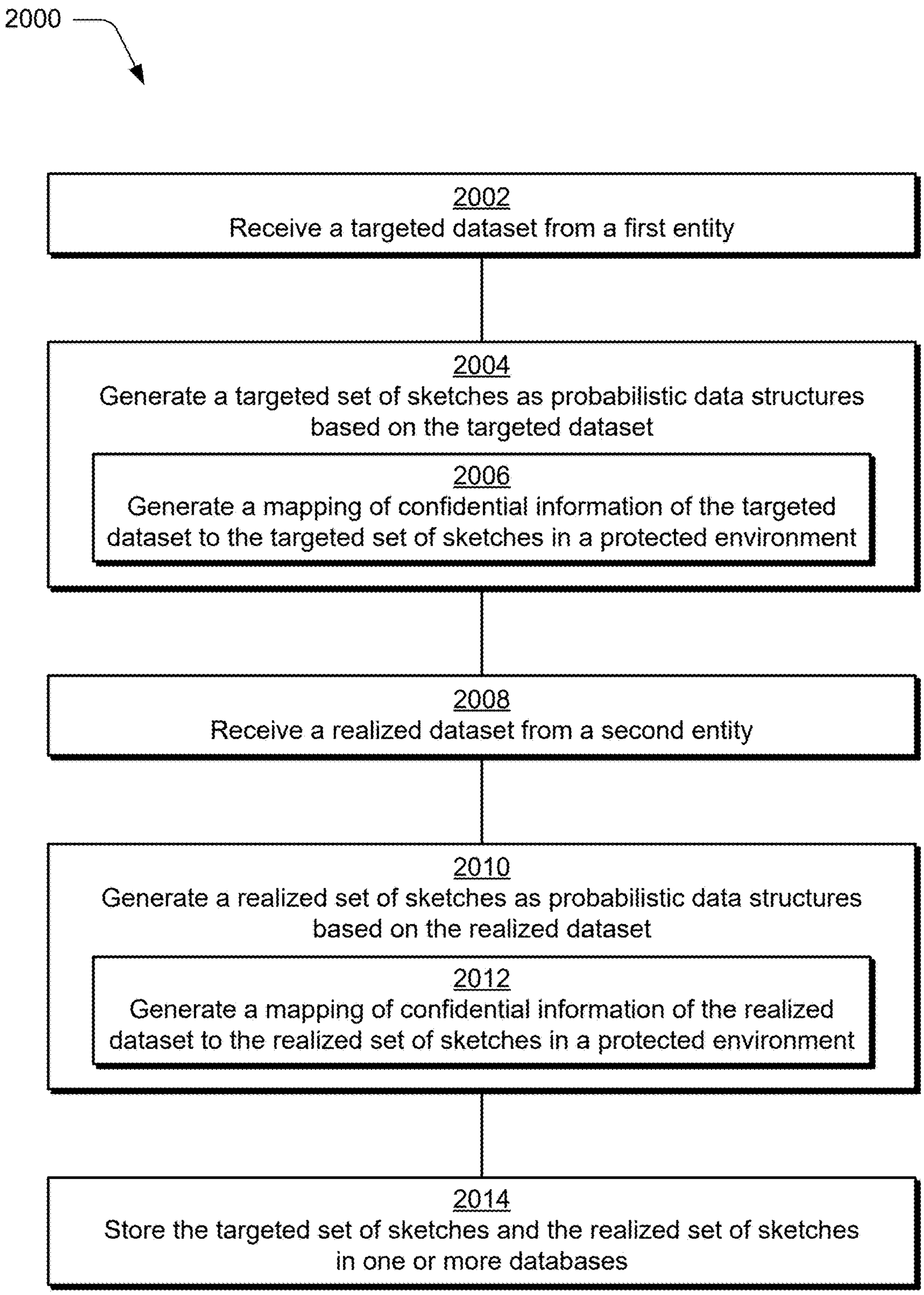
FIG. 20 is a flow diagram depicting an algorithm as a step-by-step procedure in an example implementation of operations performable for accomplishing a result of audience analytics that leverage probabilistic data structures.

FIG. 19 depicts a system 1900 in an example implementation showing sketch generation for a targeted audience and a realized audience. FIG. 20 is a flow diagram depicting an algorithm 2000 as a step-by-step procedure in an example implementation of operations performable for accomplishing a result of audience analytics that leverage probabilistic data structures. In portions of the following discussion, reference is made in parallel to FIG. 20 along with a discussion of corresponding system 1900 of FIG. 19.

The system 1900 in the illustrated example is implemented in whole or in part by the service provider system 102 and/or the computing device 104, e.g., as associated with an entity. The computing device 104, for instance, is configurable to implement the dataset manager module 122 locally within a protected environment. The service provider system 102 in this instance implements the database manager module 702 of the database 120 that maintains the sketches 136 in a shared environment as described in relation to FIGS. 2-10.

In another instance, the service provider system 102 implements both the dataset manager module 122 and the database manager module 702. The dataset manager module 122, for instance, is executable within a protected environment of the service provider system 102, e.g., to maintain a mapping. The database manager module 702, on the other hand, is executable with a shared environment of the service provider system 102, e.g., to maintain the sketches 136 within the database 120, examples of which are described in relation to FIGS. 11-16. A variety of other examples are also contemplated.

In the illustrated scenario, a sketch 136 serves as a basis for audience analysis. As previously described, probabilistic data structures 138 and a database 120 having probabilistic data structures are employed that do not include confidential information while maintaining data associated with the confidential information through the use of a "sketch."

A sketch 136 employs a probabilistic data structure that is used to represent data in a condensed form. Sketches 136, for instance, employ algorithms (e.g., a Bloom filter, a Theta Sketch, or a MinHash), that support data representation without storing row-level information containing the confidential information 130, which ensures privacy by eliminating use of user identities, user audiences, or other confidential information. By storing a sketch 136 independent of row-level data, recovery of a corresponding user, entity, or other confidential information associated with the data is not possible. Thus, a database 120 having probabilistic data structures (e.g., the sketch) does not support direct identification of the confidential information. As a result, these techniques support compliance with privacy regulations and eliminate a risk of data leakage.

Sketches 136 are also configurable to represent data in a highly condensed form, thereby reducing an amount of data that is stored and processed. This efficiency supports faster query execution and efficient use of computational resources. Conventional queries that could take days to process by a computing device (e.g., set operations), for instance, are performable in real time using the techniques described herein.

To begin in this example, a targeted dataset 1902 is received from a first entity, e.g., a strategy computing device 1702. The targeted dataset 1902 has a plurality of target dataset records 1904 describing a targeted audience 1706 subject to a targeted content control strategy 1704 (block 2002). A targeted set of sketches 1906 (i.e., a first set) are generated as probabilistic data structures 138 based on the targeted dataset 1902 (block 2004). The targeted set of sketches 1906, for instance, are configured to remove confidential information (e.g., membership identifiers) and incorporate attributes and corresponding identity keys. The probabilistic data structure 138, for instance, is based on the identity key 208 and the attribute 132 and is independent of the membership ID 206. Further, the attributes 132 in these examples are not sampled through use of the probabilistic data structure 138, but rather included in their entirety thereby improving accuracy over conventional techniques.

Generation of the targeted set of sketches 1906 is performed within a first protected environment 1102(1), which may be implemented locally at the strategy computing device 1702 and/or remotely as part of the service provider system 102 as shown in FIG. 13. In one or more implementations as previously described, a mapping module 204 is also configured to form a mapping 212(1) between the confidential information 130 of the targeted dataset 1902 and the targeted set of sketches 1906 (e.g., an identity key associated with the sketches) in the first protected environment 1102(1) (block 2006), i.e., a targeted protected environment.

In this example, the targeted set of sketches 1906 describe the targeted audience 1706 that is subject to the targeted content control strategy 1704, e.g., specified segment of a user population. Therefore, the confidential information as part of the mapping 212(1) is maintained within the first protected environment 1102(1) associated with the strategy computing device 1702 (i.e., a first entity) and is inaccessible to the publisher computing device 1708, i.e., a second entity.

Likewise, a realized dataset 1820 is received from a second entity, e.g., a publisher computing device 1708 (block 2008). The realized dataset 1820 has a plurality of realized dataset records 1812 describing a realized audience 1718 (block 2002).

A realized set of sketches 1908 (i.e., a second set) are generated as probabilistic data structures 138 based on the realized dataset 1810 (block 2010). The realized set of sketches 1908, for instance, are configured to remove confidential information (e.g., membership identifiers) and incorporate attributes and corresponding identity keys. The probabilistic data structure 138, for instance, is based on the identity key 208 and the attribute 132 and is independent of the membership ID 206. Further, the attributes 132 in these examples are not sampled through use of the probabilistic data structure 138, but rather included in their entirety thereby improving accuracy over conventional techniques.

Generation of the realized set of sketches 1908 is performed within a second protected environment 1102(2), which may be implemented locally at the publisher computing device 1708 and/or remotely as part of the service provider system 102 as shown in FIG. 13. In one or more implementations as previously described, a mapping module 204 is also configured to form a mapping 212(2) between the confidential information 130 of the realized dataset 1820 and the realized set of sketches 1908 (e.g., an identity key associated with the sketches) in the second protected environment 1102(1) (block 2012).

In this example, the realized set of sketches 1908 describe interactions of the realized audience 1718 as exposed to the digital content as specified by the targeted content control strategy 1704. Therefore, the confidential information as part of the mapping 212(1) is maintained within the second protected environment 1102(2) associated with the publisher computing device 1708 (i.e., a second entity) and is inaccessible to the strategy computing device 1702, i.e., a first entity.

The mappings 212(1), 212(2), as previously described, are usable to resolve what confidential information 130 (e.g., the membership ID 206) corresponds with a respective sketch. The mappings 212(1), 212(2) are maintained within respective first and second protected environments 1102(1), 1102(2) and are not exposed outside of the protected environments, thereby protecting the confidential information 130 from compromise by malicious parties.

The targeted set of sketches 1906 and the realized set of sketches 1908 are then stored in one or more databases in support of one or more operations, execution of which generates a probabilistic result to a query (block 2014). The targeted set of sketches 1906, for instance, are stored in a first database 120(1) by a database manager module 702 within a shared environment 1104 as associated with the strategy computing device 1702. The realized set of sketches 1908 are stored in a second database 120(1) by a database manager module 702 within a shared environment 1104 as associated with the publisher computing device 1708. Storage of the sketches supports a variety of functionalities, examples of which are described in greater detail below.

Figure 21:
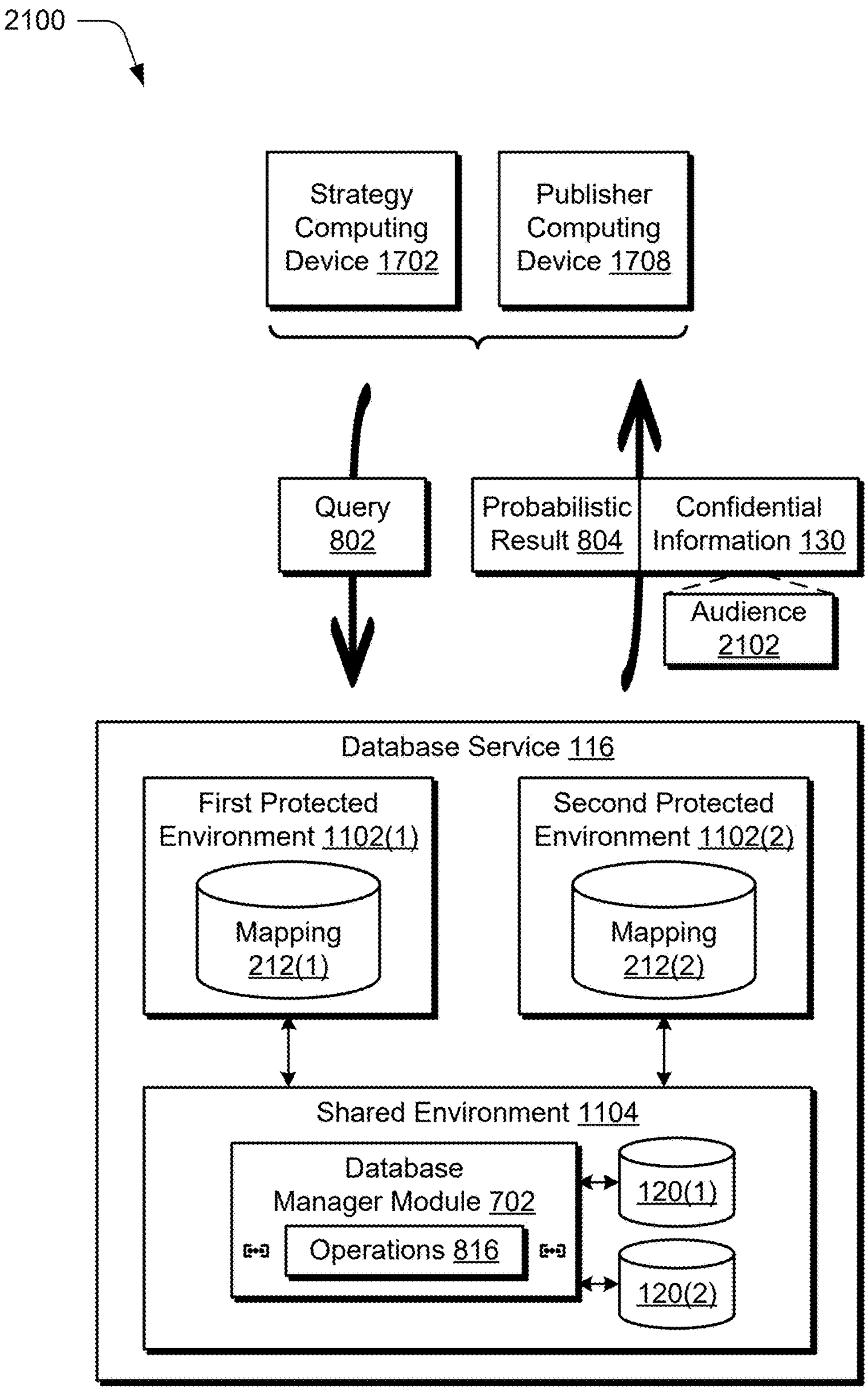
FIG. 21 depicts a system in an example implementation showing query processing and production of a probabilistic result using one or more operations of a database and the targeted and realized set of sketches of FIG. 19.
Figure 22:
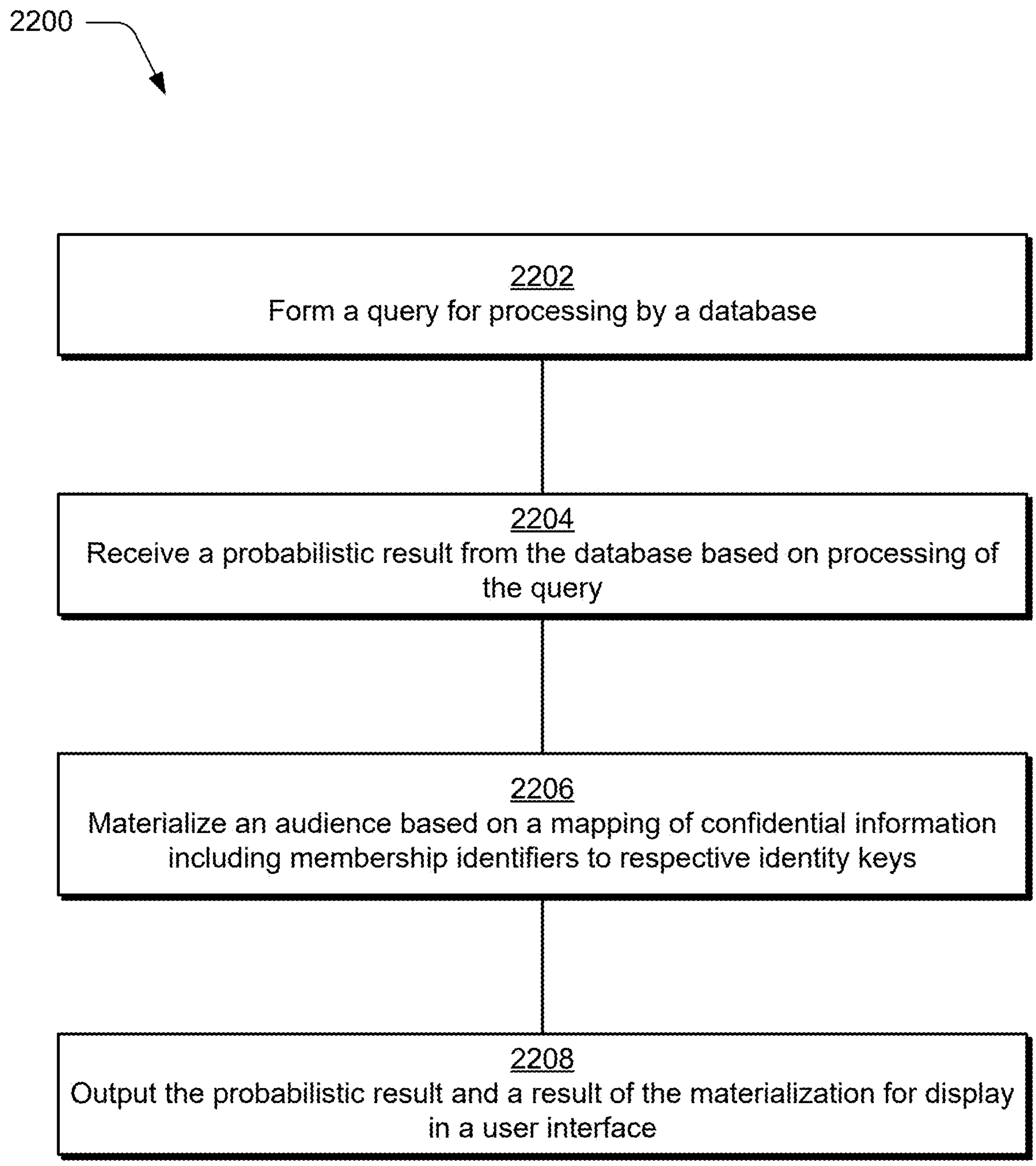
FIG. 22 is a flow diagram depicting an algorithm as a step-by-step procedure in an example implementation of operations performable for accomplishing a result of materializing an audience by leveraging probabilistic data structures and a mapping of confidential information.

FIG. 21 depicts a system 2100 in an example implementation showing query processing and production of a probabilistic result using one or more operations of a database and the targeted and realized set of sketches of FIG. 19. FIG. 22 is a flow diagram depicting an algorithm 2200 as a step-by-step procedure in an example implementation of operations performable for accomplishing a result of materializing an audience by leveraging probabilistic data structures and a mapping of confidential information. In portions of the following discussion, reference is made in parallel to FIG. 22 along with a discussion of corresponding system 2100 of FIG. 21.

This example begins by forming a query for processing by one or more databases (block 2202), e.g., database 120(1), database 120(2), and so on. Database 120(1), for instance, includes a targeted set of sketches configured as probabilistic data structures based on a targeted dataset. Database 120(2) includes a realized set of sketches configured as probabilistic data structures based on a realized dataset.

The query 802 may be originated by the strategy computing device 1702 or the publisher computing device 1708. The query 802 in this example may be passed directly to the database manager module 702 within the shared environment 1104 or indirectly via the dataset manager module 122 within the first or second protected environments 1102(1), 1102(2).

The database manager module 702 then processes the query 802 using one or more operations 816 with respect to the databases 120(1), 120(2). A probabilistic result 804 is generated based on the processing as further described below by the databases 120(1), 120(2) using the query 802. The processing, for instance, may involve at least one sketch from the targeted set of sketches (e.g., from database 120(1)) and at least one sketch from the realized set of sketches (block 2204), e.g., from database 120(2). A variety of operations 816 are supported as previously described in relation to FIG. 8, examples of which include an intersect operation, a union operation, and so on.

The probabilistic result 804 is then received by the dataset manager module 122 within the protected environment 1102 from the database manager module 702 in the shared environment 1104, e.g., which may be performed remotely as illustrated, locally at the respective strategy and publisher computing devices 1702, 1708, and so forth.

The dataset manager module 122, through use of the mapping module 204, is then configured to materialize an audience 2102 based on a mapping of confidential information to the probabilistic data structure (block 2206). Mappings 212(1), 212(2) maintained within respective first and second protected environments 1102(2), 1102(2), for instance, are usable to resolve respective confidential information 130 associated with entities.

The mapping 212, for instance, is configurable by the mapping module 204 to detect which of the confidential information 130 is represented in a respective sketch 136, e.g., membership IDs. In this way, the entities are configurable to resolve member identifiers of known members but are not able to resolve membership identifiers of unknown members, e.g., which are known by the other entity.

The dataset manager module 122 is then configured to expose the probabilistic result 804 and the confidential information 130 as a result of the materialization for display in a user interface (block 2208), e.g., for presentation and display in a user interface. As a result, the computing device 104 is given insight into known membership IDs associated with the probabilistic result 804 and based on this may take a variety of actions.

Figure 23:
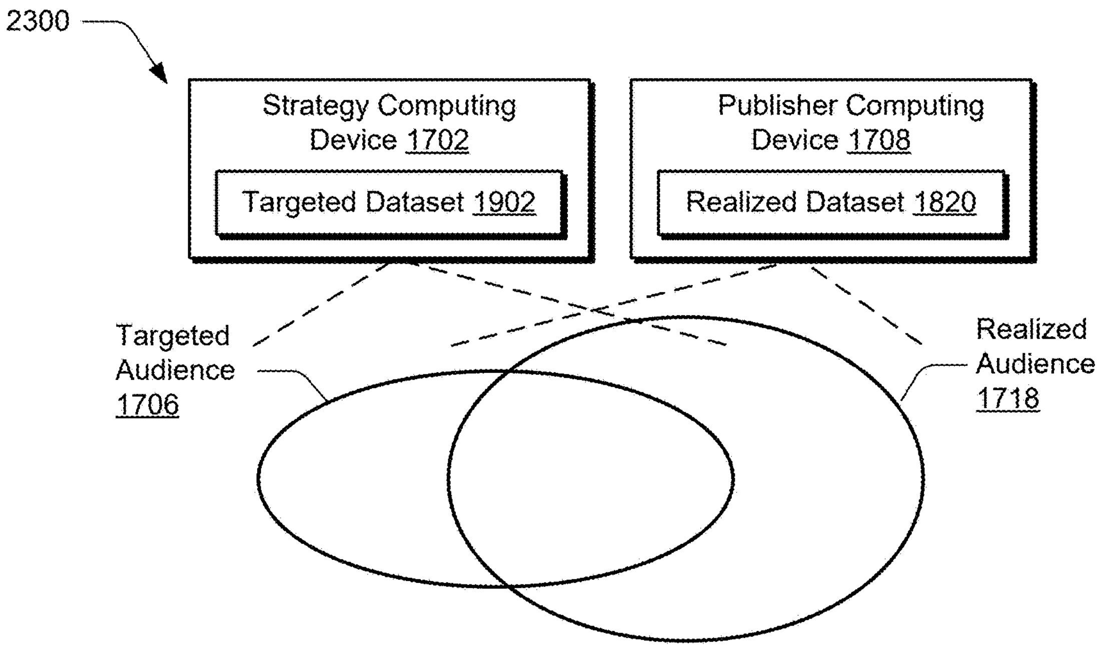
FIG. 23 depicts an example implementation showing a targeted audience described by a targeted dataset and a realized audience described by a realized dataset.

FIG. 23 depicts an example implementation 2300 showing a targeted audience 1706 described by a targeted dataset 1902 and a realized audience 1718 described by a realized dataset 1820. In this scenario, a single publisher and associated publisher computing device 1708 generate the realized dataset 1820 as described in relation to FIG. 18, e.g., based on a log 1804 of log events 1806.

The targeted audience 1706 is for "sports lovers" as identified by the strategy computing device 1702. The targeted content control strategy 1704, when implemented by the publisher computing device 1708 then results in generation of a realized audience 1718 as described by the realized dataset 1820, e.g., based on monitored user interactions with the digital content 1710. The realized audience 1718, for instance, may be generated to describe user exposure to the digital content over a defined amount of time, e.g., one hour. Thus, the realized audience 1718 describes the audience that was exposed to the digital content as dictated by the targeted content control strategy 1704.

Figure 24:
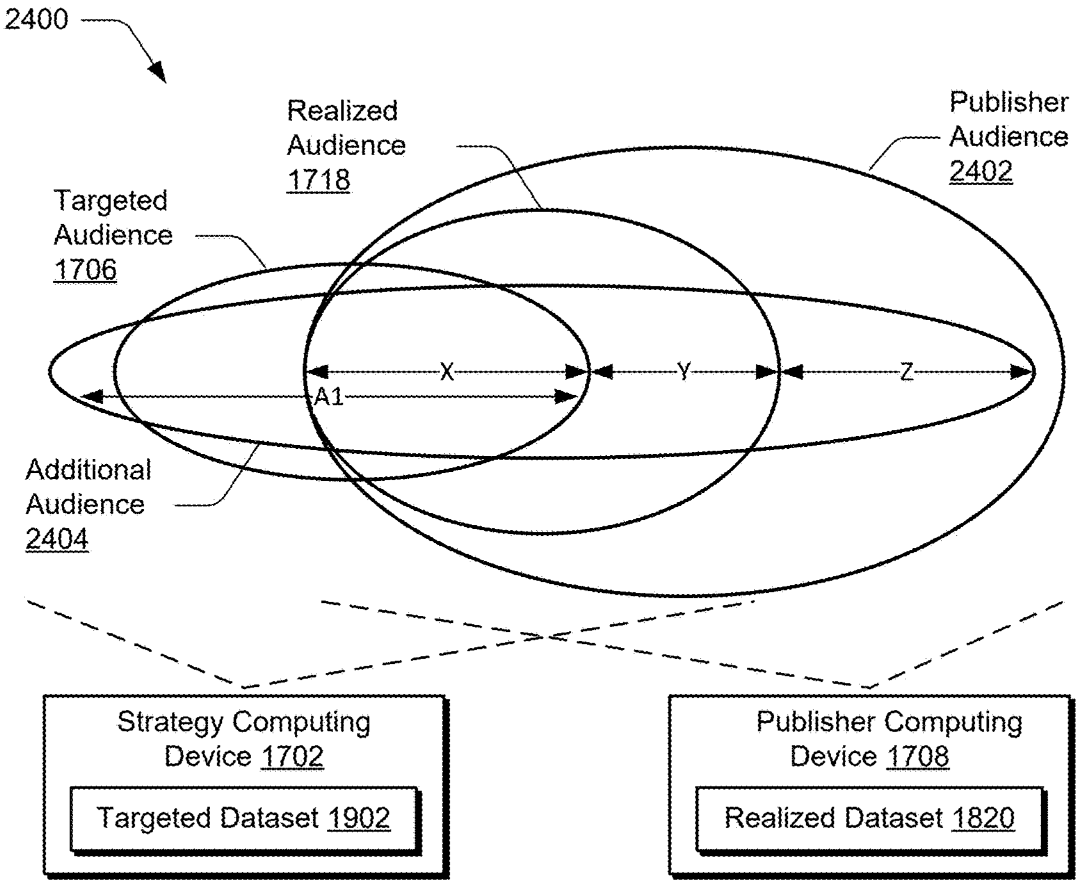
FIG. 24 depicts an example implementation showing an example of audience identification.

FIG. 24 depicts an example implementation 2400 showing an example of audience identification. A publisher audience 2402 is depicted that defines a total audience of membership identifiers known to the published computing device 1708. An additional audience 2404 (e.g., "purse buyers") is also depicted with "A1" representing a subset of the additional audience 2404 that is known to the strategy computing device 1702, e.g., associated with an advertiser. The task in this instance is to estimate a portion of the additional audience 2404 that is exposed to the targeted content control strategy 1704.

To begin in this example, the dataset manager module 122 prepares the targeted dataset 1902 and the realized dataset 1820 to generate the targeted set of sketches 1906 and the realized set of sketches 1908. Sketches 136, for instance, are generated for each identity key for each of the audiences known to the strategy computing device 1702, e.g., "A=sports lovers" and "A1=purse buyers." The realized dataset 1820 includes additional dimensions denoted as "f1," "f2", and so forth such as for "genre," "state," and so forth.

The dataset manager module 122, for instance, scans an entirety of the log 1804 for a fixed time period and generated sketches 136 for each feature and an additional sketch describing an entirety of an audience independent of feature inclusion. Thus, a sketch 136 may be created for each identity key per feature, which a publisher configurable to include multiple identity keys. As previously described, sketches are configurable as a combination of theta sketches, HLL, Bloom filters, and so on.

The database manager module 702 is then tasked with building overlap metrics to identify the audience. In a scenario involving aggregate data in the log 1804, the database manager module 702 retrieves at least one sketch from the realized set of sketches 1908 for a fixed time interval for respective queries, e.g., "C∩A," "C∩A1," "C∩A2," and so on resulting from queries "|C|," "|C∩A|," "|C∩A1|," "|C∩A2|," and so on. The aggregates may be further split by publisher features "f1," "f2," . . . "(A.2)," thus generating "|C∩f1|," "|C∩f2|," . . . , "|C∩A∩f1|," "|C∩A1∩f2|," "|C∩A2∩f3|," and so on.

In a scenario involving "raw" data from the log 1804, new sketches are created using an intersect operation as "C," "C∩A," "C∩A1," "C∩A2," and so forth. The cardinalities of these sketches are the overlap counts by the respective features from strategy computing device 1702 (e.g., the advertiser) and the publisher computing device 1708, e.g., the publisher. If the realized dataset 1810 includes additional features (A.2), then each of the sketches "f1," "f2," "f3," . . . are intersected with the sketches generated using the intersect operation thereby generating "|C∩f1|," "|C∩f2|," . . . , "|C∩A∩f1|," "|C∩A1∩f2|," "|C∩A2∩f3|," and so on.

Audiences "A," "A1," "A2" are specific to the advertiser, and are effectively the advertiser audience dimensions. The computations from the aggregate and raw sketches provide cardinalities of various sets for the same fixed time interval, for example one hour. Using the cardinalities of various sets, statistical extrapolation may be utilized to estimate cardinalities of other sets. For example, a simple linear extrapolation based on "|C|," "|C∩A|," "|C∩A∩A1|" is usable to estimate cardinality of "|C∩A1|." Extrapolations of the aggregates may be biased, which may be estimated using various techniques such as multi-fold-cross validation using publisher features "f1," "f2," . . . , where available or a Bayesian technique based on prior knowledge. Conversion data from the strategy computing device 1702 is convertible to a probabilistic set, e.g., a bloom filter with differential privacy enhancements. The conversion data may further split by advertiser dimensions "A1," "A2," etc. as previously described. In an implementation, this technique is used if raw log data is available to find identity keys, each matching identity key representing potentially attributable conversion.

These techniques support a variety of technical advantages. The techniques, for instance, are operable solely based on aggregate data. Additionally, processing raw logs as sketches results in a significant query processing cost reduction. Use of a common data format, when processing sketches generated from raw logs, supports cross-cloud, cross-region measurements without incurring data movement costs. Advertiser conversion data is also usable as an aggregate probabilistic set, thus increasing privacy and advertiser are able to use data dimensionally to measure campaign effectiveness. These techniques are also extendable from a single publisher example above to multiple publishers, thus providing a uniform measurement using advertiser specific dimension. Further, conversion attribution may be performed independent of record level data, thus protecting valuable business data belonging to advertisers.

Figure 25:
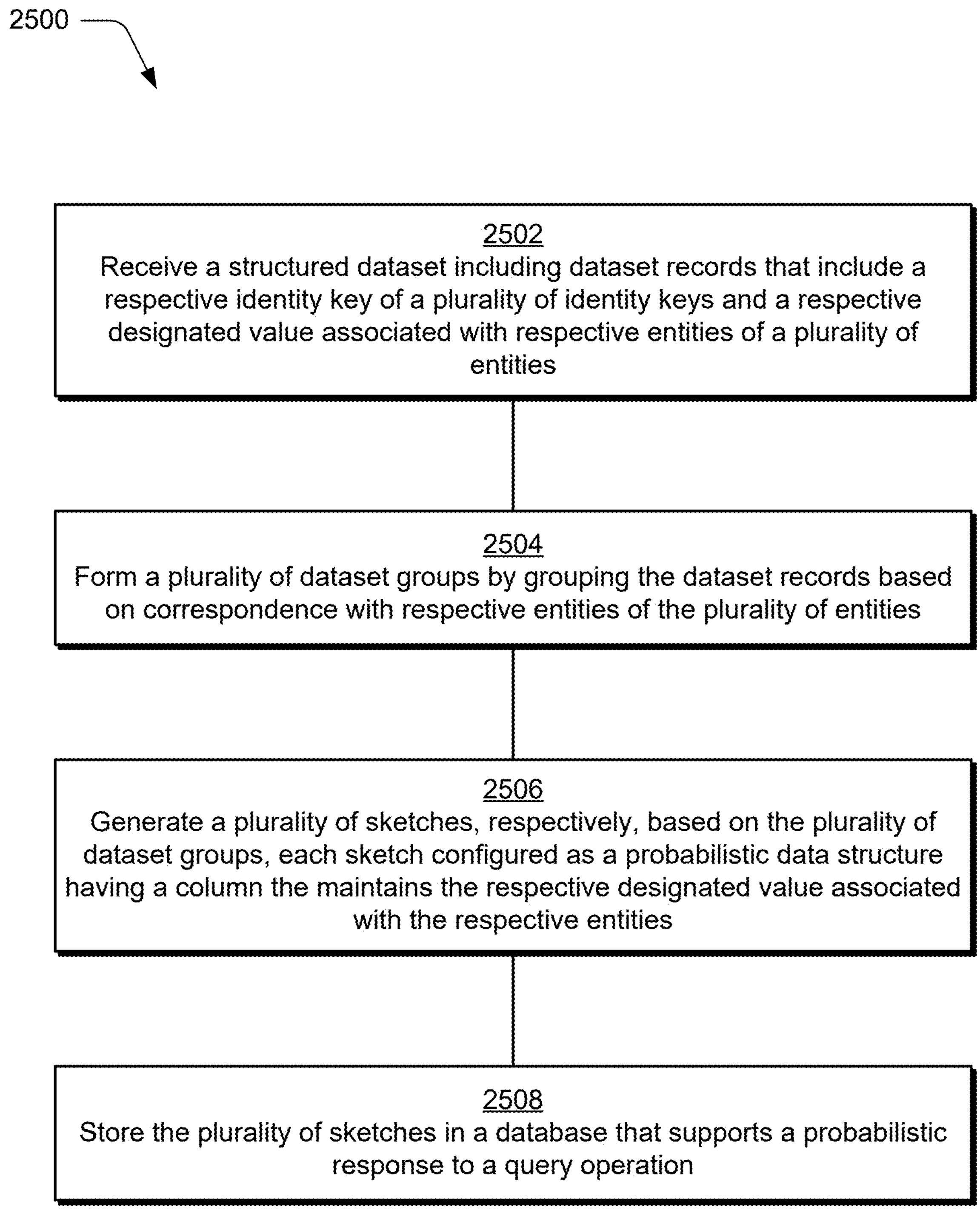
FIG. 25 is a flow diagram depicting an algorithm as a step-by-step procedure in an example implementation of operations performable for accomplishing a result of sketch generation based on groupings of dataset records.

FIG. 25 is a flow diagram depicting an algorithm 2500 as a step-by-step procedure in an example implementation of operations performable for accomplishing a result of sketch generation based on groupings of dataset records. To begin in this example, a structured dataset is received. The structured dataset includes a plurality of dataset records that include a respective identity key of a plurality of identity keys, a plurality of attributes associated, respectively, with the plurality of identity keys. A plurality of membership identifiers are also associated with respective attributes (block 2502).

A plurality of dataset groups are then formed by grouping the dataset records based on correspondence with membership identifiers of the plurality of membership identifiers (block 2504). A plurality of sketches are generated, respectively, based on the plurality of dataset groups, each sketch configured as a probabilistic data structure based on one or more identity keys and one or more said attributes of the plurality of dataset records associated with a respective said group (block 2506). The plurality of sketches are stored in a probabilistic database that supports a probabilistic result to a query (block 2508).

Figure 26:
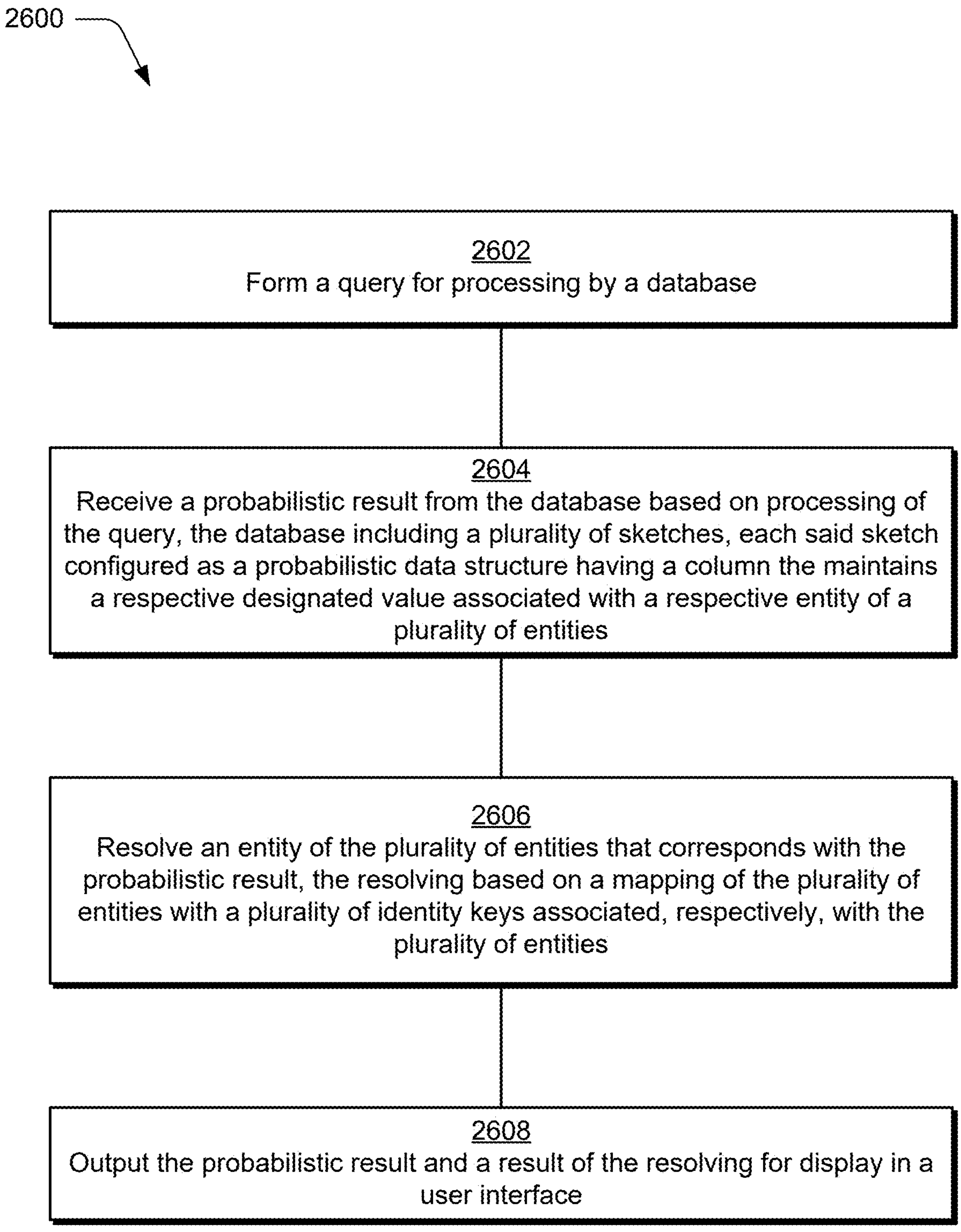
FIG. 26 is a flow diagram depicting an algorithm as a step-by-step procedure in an example implementation of operations performable for accomplishing a result of resolving an entity as corresponding to a probabilistic result received in response to a query.

FIG. 26 is a flow diagram depicting an algorithm 2600 as a step-by-step procedure in an example implementation of operations performable for accomplishing a result of resolving an entity as corresponding to a probabilistic result received in response to a query. A query is formed for processing by a probabilistic database (block 2602). A probabilistic result is received from the probabilistic database based on processing of the query. The probabilistic database includes a plurality of sketches, each sketch configured as a probabilistic data structure (block 2604). An entity of a plurality of entities (e.g., members) that corresponds with the probabilistic result. The resolving is based on a mapping of the plurality of entities with the plurality of sketches (block 2606). The probabilistic result and a result of the resolving for display in a user interface (block 2608), e.g., a display of the entity associated with an answer to the query.

Figure 27:
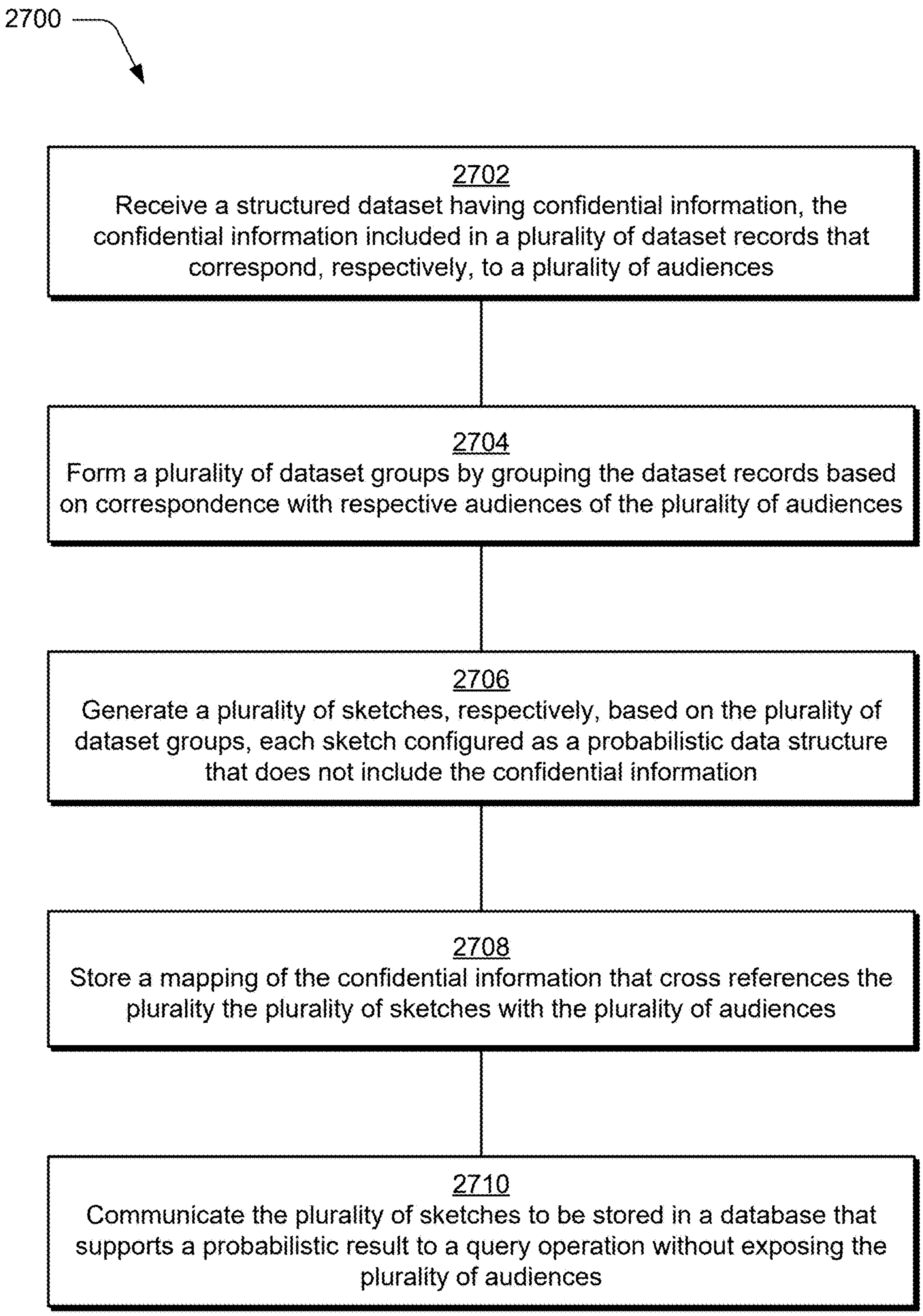
FIG. 27 is a flow diagram depicting an algorithm as a step-by-step procedure in an example implementation of operations performable for accomplishing a result of sketch generation based on dataset groups formed for respective audiences of users.

FIG. 27 is a flow diagram depicting an algorithm 2700 as a step-by-step procedure in an example implementation of operations performable for accomplishing a result of sketch generation based on dataset groups formed for respective audiences of users. A structured dataset is received having confidential information. The confidential information is included in a plurality of dataset records that correspond, respectively, to a plurality of audiences (block 2702).

A plurality of dataset groups are formed by grouping the dataset records based on correspondence with respective audiences of the plurality of audiences (block 2704). A plurality of sketches are generated, respectively, based on the plurality of dataset groups. Each sketch is configured as a probabilistic data structure that does not include the confidential information (block 2706). A mapping is then stored of the confidential information that cross references the plurality the plurality of sketches with the plurality of audiences (block 2708). The plurality of sketches are also communicated to be stored in a probabilistic database that supports a probabilistic result to a query operation without exposing the plurality of audiences (block 2710).

Example System and Device

Figure 28:
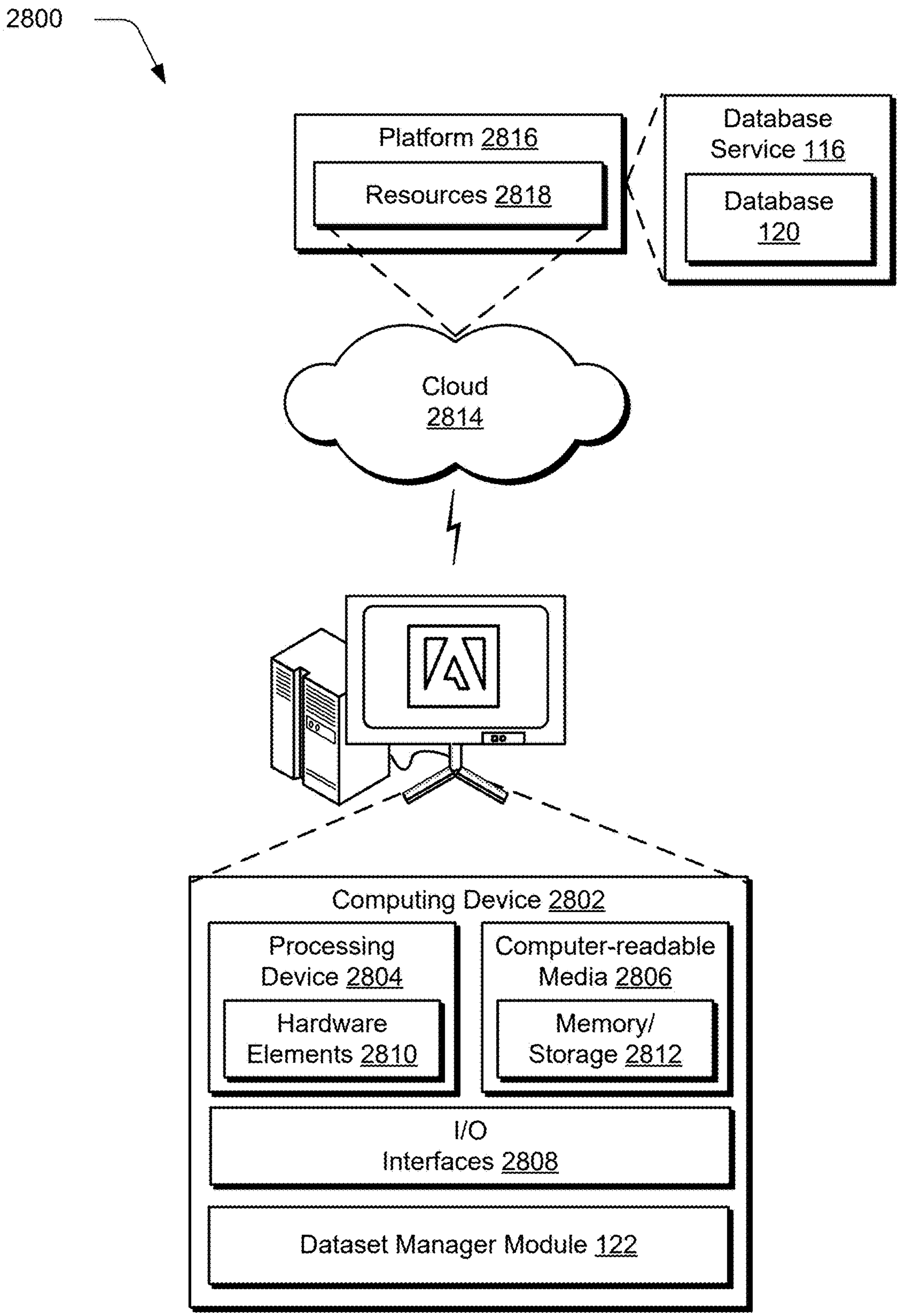
FIG. 28 illustrates an example system including various components of an example device that can be implemented as any type of computing device as described and/or utilize with reference to the previous figures to implement embodiments of the techniques described herein.

FIG. 28 illustrates an example system generally at 2800 that includes an example computing device 2802 that is representative of one or more computing systems and/or devices that implement the various techniques described herein. This is illustrated through inclusion of the database service 116, the database having probabilistic data structures 138, and the dataset manager module 122. The computing device 2802 is configurable, for example, as a server of a service provider, a device associated with a client (e.g., a client device), an on-chip system, and/or any other suitable computing device or computing system.

The example computing device 2802 as illustrated includes a processing device 2804, one or more computer-readable media 2806, and one or more I/O interface 2808 that are communicatively coupled, one to another. Although not shown, the computing device 2802 further includes a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing device 2804 is representative of functionality to perform one or more operations using hardware. Accordingly, the processing device 2804 is illustrated as including hardware element 2810 that is configurable as processors, functional blocks, and so forth. This includes implementation in hardware as an application specific integrated circuit or other logic device formed using one or more semiconductors. The hardware elements 2810 are not limited by the materials from which they are formed or the processing mechanisms employed therein. For example, processors are configurable as semiconductor(s) and/or transistors (e.g., electronic integrated circuits (ICs)). In such a context, processor-executable instructions are electronically-executable instructions.

The computer-readable storage media 2806 is illustrated as including memory/storage 2812 that stores instructions that are executable to cause the processing device 2804 to perform operations. The computer-readable storage medium is configured for storing instructions that, responsive to execution by the processing device, causes the processing device to perform operations. The memory/storage 2812 represents memory/storage capacity associated with one or more computer-readable media. The memory/storage 2812 includes volatile media (such as random access memory (RAM)) and/or nonvolatile media (such as read only memory (ROM), Flash memory, optical disks, magnetic disks, and so forth). The memory/storage 2812 includes fixed media (e.g., RAM, ROM, a fixed hard drive, and so on) as well as removable media (e.g., Flash memory, a removable hard drive, an optical disc, and so forth). The computer-readable media 2806 is configurable in a variety of other ways as further described below.

Input/output interface(s) 2808 are representative of functionality to allow a user to enter commands and information to computing device 2802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., employing visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 2802 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are configurable on a variety of commercial computing platforms having a variety of processors.

An implementation of the described modules and techniques is stored on or transmitted across some form of computer-readable media. The computer-readable media includes a variety of media that is accessed by the computing device 2802. By way of example, and not limitation, computer-readable media includes "computer-readable storage media" and "computer-readable signal media."

"Computer-readable storage media" refers to media and/or devices that enable persistent and/or non-transitory storage of information (e.g., instructions are stored thereon that are executable by a processing device) in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include but are not limited to RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and are accessible by a computer.

"Computer-readable signal media" refers to a signal-bearing medium that is configured to transmit instructions to the hardware of the computing device 2802, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 2810 and computer-readable media 2806 are representative of modules, programmable device logic and/or fixed device logic implemented in a hardware form that are employed in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also be employed to implement various techniques described herein. Accordingly, software, hardware, or executable modules are implemented as one or more instructions and/or logic embodied on some form of computer-readable storage media and/or by one or more hardware elements 2810. The computing device 2802 is configured to implement particular instructions and/or functions corresponding to the software and/or hardware modules. Accordingly, implementation of a module that is executable by the computing device 2802 as software is achieved at least partially in hardware, e.g., through use of computer-readable storage media and/or hardware elements 2810 of the processing device 2804. The instructions and/or functions are executable/operable by one or more articles of manufacture (for example, one or more computing devices 2802 and/or processing devices 2804) to implement techniques, modules, and examples described herein.

The techniques described herein are supported by various configurations of the computing device 2802 and are not limited to the specific examples of the techniques described herein. This functionality is also implementable all or in part through use of a distributed system, such as over a "cloud" 2614 via a platform 2816 as described below.

The cloud 2814 includes and/or is representative of a platform 2816 for resources 2818. The platform 2816 abstracts underlying functionality of hardware (e.g., servers) and software resources of the cloud 2814. The resources 2818 include applications and/or data that can be utilized while computer processing is executed on servers that are remote from the computing device 2802. Resources 2818 can also include services provided over the Internet and/or through a subscriber network, such as a cellular or Wi-Fi network.

The platform 2816 abstracts resources and functions to connect the computing device 2802 with other computing devices. The platform 2816 also serves to abstract scaling of resources to provide a corresponding level of scale to encountered demand for the resources 2818 that are implemented via the platform 2816. Accordingly, in an interconnected device embodiment, implementation of functionality described herein is distributable throughout the system 2800. For example, the functionality is implementable in part on the computing device 2802 as well as via the platform 2816 that abstracts the functionality of the cloud 2814.

In implementations, the platform 2816 employs a "machine-learning model" that is configured to implement the techniques described herein. A machine-learning model refers to a computer representation that can be tuned (e.g., trained and retrained) based on inputs to approximate unknown functions. In particular, the term machine-learning model can include a model that utilizes algorithms to learn from, and make predictions on, known data by analyzing training data to learn and relearn to generate outputs that reflect patterns and attributes of the training data. Examples of machine-learning models include neural networks, convolutional neural networks (CNNs), long short-term memory (LSTM) neural networks, decision trees, and so forth.

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A computing device comprising:

a processing device; and a computer-readable storage medium storing instruction that, responsive to execution by the processing device, causes the processing device to perform operations including:

forming a query for processing by one or more databases having a targeted set of sketches configured as probabilistic data structures based on a targeted dataset and a realized set of sketches configured as probabilistic data structures based on a realized dataset, the realized dataset including log event data of an audience, the targeted set of sketches stored independent of the realized set of sketches, and the targeted set of sketches configured such that recovery of the log event data from the probabilistic data structures is prevented;

receiving a result including at least one sketch having a probabilistic data structure generated based on at least one said sketch from the targeted set of sketches and at least one said sketch from the realized set of sketches; and materializing an audience based on a mapping of confidential information to the probabilistic data structure.

2. The computing device as described in claim 1, wherein the targeted dataset describes a first audience used as a basis to form a targeted content control strategy to control digital content output and the realized dataset describes a second audience that received the digital content output.

3. The computing device as described in claim 1, wherein the mapping maps an identity key of the at least one sketch to a membership identifier maintained as confidential information.

4. The computing device as described in claim 1, wherein the one or more databases are maintained in a shared environment and the materializing is performed within a protected environment that maintains the mapping.

5. The computing device as described in claim 1, wherein the result is generated based on a union or intersect operation using the at least one said sketch from the targeted set of sketches and the at least one said sketch from the realized set of sketches.

6. The computing device as described in claim 1, wherein the targeted dataset is associated with a first entity that maintains respective confidential information within a first protected environment and the realized dataset is associated with a second entity that maintains respective confidential information with a second protected environment.

7. The computing device as described in claim 6, wherein the respective confidential information maintained in the first protected environment is inaccessible by the second entity and the respective confidential information maintained in the second protected environment is inaccessible by the first entity.

8. A method comprising:

forming, by a processing device, a query for processing by one or more databases having a targeted set of sketches configured as probabilistic data structures based on a targeted dataset and a realized set of sketches configured as probabilistic data structures based on a realized dataset, the realized dataset including log event data of an audience, the targeted set of sketches stored independent of the realized set of sketches, and the targeted set of sketches configured such that recovery of the log event data from the probabilistic data structures is prevented;

receiving, by the processing device, a result including at least one sketch having a probabilistic data structure generated based on at least one said sketch from the targeted set of sketches and at least one said sketch from the realized set of sketches; and materializing, by the processing device, an audience based on a mapping of confidential information to the probabilistic data structure.

9. The method as described in claim 8, wherein the targeted dataset includes records describing the audience subject to a targeted content control strategy.

10. The method as described in claim 8, wherein the targeted set of sketches are generated based, at least in part, on forming a mapping of confidential information included in a plurality of targeted dataset records to the targeted set of sketches, respectively.

11. The method as described in claim 10, wherein the plurality of targeted dataset records includes an identity key, a respective attribute, and the confidential information and the mapping maps one or more said identity keys to the confidential information.

12. The method as described in claim 11, wherein the realized dataset is received and the realized set of sketches are generated in a protected environment associated with the first entity and the mapping is maintained within the protected environment as inaccessible to the second entity.

13. The method as described in claim 8, wherein the realized set of sketches are generated based on forming a mapping of confidential information included in the realized dataset to the realized set of sketches, respectively.

14. The method as described in claim 13, wherein the realized dataset includes records of an identity key, a respective attribute, and confidential information and the mapping maps one or more said identity keys to the confidential information.

15. The method as described in claim 14, wherein the realized dataset is received and the realized set of sketches are generated in a protected environment associated with a second entity and the mapping is maintained within the protected environment as inaccessible to a first entity.

16. The method as described in claim 8, wherein the targeted set of sketches include a probabilistic data structure stored independent of row-level data of the targeted dataset from a first entity and the realized set of sketches as probabilistic data structures are stored independent of row-level data of the realized dataset from a second entity.

17. The method as described in claim 8, further comprising materializing membership identifiers associated with the audience based on a mapping of confidential information including respective said membership identifiers to a respective identity key.

18. One or more computer-readable storage media storing instructions that, responsive to execution by a processing device, causes the processing device to perform operations comprising:

forming a query for processing by one or more databases having a targeted set of sketches configured as probabilistic data structures based on a targeted dataset and a realized set of sketches configured as probabilistic data structures based on a realized dataset, the realized dataset including log event data of an audience, the targeted set of sketches stored independent of the realized set of sketches, and the targeted set of sketches configured such that recovery of the log event data from the probabilistic data structures is prevented;

receiving a result including at least one sketch having a probabilistic data structure generated based on at least one said sketch from the targeted set of sketches and at least one said sketch from the realized set of sketches; and materializing an audience based on a mapping of confidential information to the probabilistic data structure.

19. The one or more computer-readable storage media as described in claim 18, wherein the at least one sketch is generated within a shared environment and the materializing is performed within a protected environment that maintains the mapping.

20. The one or more computer-readable storage media as described in claim 18, wherein the materializing the audience is based, at least in part, on identifying respective users in a user audience by one or more membership identifiers.

* * * * *